US012777091B2

(12) United States Patent
Xue

(10) Patent No.: US 12,777,091 B2
(45) Date of Patent: Oct. 27, 2026

(54) DATA SYNCHRONIZATION METHOD, ELECTRONIC DEVICE, AND COMPUTER-READABLE STORAGE MEDIUM

(71) Applicant: Huawei Technologies Co., Ltd., Shenzhen (CN)

(72) Inventor: Zhubiao Xue, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 298 days.

(21) Appl. No.: 18/002,743

(22) PCT Filed: Apr. 6, 2021

(86) PCT No.: PCT/CN2021/085557
§ 371 (c)(1),
(2) Date: Dec. 21, 2022

(87) PCT Pub. No.: WO2021/258809
PCT Pub. Date: Dec. 30, 2021

(65) Prior Publication Data

US 2023/0247093 A1 Aug. 3, 2023

(30) Foreign Application Priority Data

Jun. 22, 2020 (CN) ........................ 202010575004.8

(51) Int. Cl.
*H04L 67/1095* (2022.01)
*H04L 67/141* (2022.01)
*H04L 67/146* (2022.01)

(52) U.S. Cl.
CPC ........ *H04L 67/1095* (2013.01); *H04L 67/141* (2013.01); *H04L 67/146* (2013.01)

(58) Field of Classification Search
CPC . H04L 67/1095; H04L 67/141; H04L 67/146; G06F 16/178
See application file for complete search history.

(56) References Cited

U.S. PATENT DOCUMENTS

2005/0163087 A1 7/2005 Ianos
2013/0086214 A1* 4/2013 Jung .................. H04L 67/1095 709/217

(Continued)

FOREIGN PATENT DOCUMENTS

CN 102546779 A 7/2012
CN 103593153 A 2/2014

(Continued)

OTHER PUBLICATIONS

Rosslina968, Bluetooth data transmission structure, Doding, Feb. 12, 2015, 53 pages, with English translation.

(Continued)

*Primary Examiner* — Christopher B Robinson
*Assistant Examiner* — Tania M Pena-Santana
(74) *Attorney, Agent, or Firm* — Conley Rose, P.C.

(57) ABSTRACT

A data synchronization method includes obtaining first to-be-synchronized data of a first application in a first electronic device and determining a first channel identifier. The first channel identifier is an identifier allocated by a second electronic device to a second application in the second electronic device, and each first channel identifier corresponds to one second electronic device A connection channel corresponding to the first channel identifier is determined, where the connection channel is a connection channel that has been established between the first electronic device and the second electronic device, and each first channel identifier corresponds to one connection channel. The first to-be-synchronized data is transmitted to the second electronic device through the connection channel cor- (Continued)

responding to the first channel identifier, to instruct the second electronic device to synchronize the first to-be-synchronized data to the second application.

20 Claims, 16 Drawing Sheets

(56) References Cited

U.S. PATENT DOCUMENTS

| | | | | |
|---|---|---|---|---|
| 2014/0136481 | A1* | 5/2014 | Quan | G06F 16/27 707/617 |
| 2014/0149550 | A1* | 5/2014 | Kaila | H04L 67/1095 709/217 |
| 2015/0178236 | A1 | 6/2015 | Sharma | |
| 2015/0350004 | A1* | 12/2015 | Sekar | G06F 11/1662 709/248 |
| 2015/0350807 | A1 | 12/2015 | Andrews et al. | |
| 2016/0321293 | A1* | 11/2016 | Auer | H04L 67/1095 |
| 2016/0337449 | A1 | 11/2016 | Yang et al. | |
| 2017/0187800 | A1* | 6/2017 | Zhao | H04L 67/1095 |
| 2022/0286503 | A1* | 9/2022 | Luo | G06F 9/4856 |

FOREIGN PATENT DOCUMENTS

| | | |
|---|---|---|
| CN | 103716390 A | 4/2014 |
| CN | 104794008 A | 7/2015 |
| CN | 106462453 A | 2/2017 |

OTHER PUBLICATIONS

Guangmingxiaojiang, Classic Bluetooth connection establishment process—L2CAP establishment and SDP process, CSDN, Dec. 28, 2018, 36 pages, with English translation.

* cited by examiner

DATA SYNCHRONIZATION METHOD, ELECTRONIC DEVICE, AND COMPUTER-READABLE STORAGE MEDIUM

CROSS-REFERENCE TO RELATED APPLICATIONS

This is a U.S. National Stage of International Patent Application No. PCT/CN2021/085557 filed on Apr. 6, 2021, which claims priority to Chinese Patent Application No. 202010575004.8 filed on Jun. 22, 2020. The disclosures of the aforementioned applications are hereby incorporated by reference in their entireties.

TECHNICAL FIELD

This application relates to the field of computer technologies, and in particular, to a data synchronization method, an electronic device, and a computer-readable storage medium.

BACKGROUND

Currently, cross-device application data synchronization is usually based on a cloud server.

In a solution in which data synchronization is implemented based on a cloud server, a same application needs to be installed on all electronic devices, and all the electronic devices access the Internet. In addition, all the electronic devices further need to be connected to the cloud server by logging in to a platform account or an application account. Based on this, one electronic device may send changed application data of the electronic device to the cloud server, and the cloud server synchronizes the changed application data to another electronic device. Similarly, when data of another electronic device changes, the electronic device may receive synchronization data sent by the cloud server. In other words, the cloud server is used as a transit station for data exchange, and the electronic device is connected to the cloud server through account login and the Internet, so that application data can be synchronized between a plurality of electronic devices.

However, the cross-device application data synchronization solution needs to depend on a cloud server and an account login mechanism. When there is no cloud server or no login account, data synchronization cannot be implemented between the plurality of electronic devices.

SUMMARY

This application provides a data synchronization method, an electronic device, and a computer-readable storage medium, to resolve a problem in the conventional technology that cross-device application data synchronization needs to depend on a cloud server and an account login mechanism.

According to a first aspect, an embodiment of this application provides a data synchronization method, applied to a first electronic device. The method may include: obtaining first to-be-synchronized data of a first application in the first electronic device; determining a first channel identifier, where the first channel identifier is an identifier allocated by a second electronic device communicatively connected to the first electronic device to a second application in the second electronic device, and each first channel identifier corresponds to one second electronic device; determining a connection channel corresponding to the first channel identifier, where the connection channel is a connection channel that has been established between the first electronic device and the second electronic device, and each first channel identifier corresponds to one connection channel; and transmitting the first to-be-synchronized data to the second electronic device through the connection channel corresponding to the first channel identifier, to indicate the second electronic device to synchronize the first to-be-synchronized data to the second application.

In this embodiment of this application, the first channel identifier is allocated to the second application in the second electronic device, so that the first electronic device can determine a connection channel of the second application by using the first channel identifier, and synchronize data of the first application to the second application through the connection channel. This implements cross-device application data synchronization in a near field environment without depending on a cloud server and an account login mechanism.

Specifically, when there are a plurality of second electronic devices, a second application in each second electronic device corresponds to one second channel identifier, that is, the second application in each second electronic device has one corresponding connection channel. The first electronic device may synchronize the data of the first application to a plurality of second applications through a connection channel of each second application. The connection channel may be used as a real-time data synchronization channel to synchronize the data of the first application in the first electronic device to second applications in one or more second electronic devices.

By way of example but not limitation, the first electronic device is a mobile phone, and the second electronic device includes a tablet and a smart large screen. In this case, the mobile phone may be used as a master device, and the tablet and the smart large screen may be used as slave devices. The tablet and the smart large screen separately allocate a first channel identifier to a second application in the slave device, and register with the master device, that is, the mobile phone, based on the first channel identifier. After the slave device is registered, the master device records a first channel identifier of each slave device and a corresponding connection channel. When the master device needs to synchronize data of the first application to a second application in each slave device, the master device may first determine the first channel identifier based on a slave device that needs to perform synchronization, and then synchronize the data of the first application to the second application in each slave device through a connection channel corresponding to the first channel identifier. In this way, data synchronization between the mobile phone and each of the tablet and the smart large screen does not need to depend on a cloud server or an account login mechanism. In a near field environment, a connection channel between the mobile phone and the tablet and a connection channel between the mobile phone and the smart large screen may be but is not limited to a Wi-Fi point-to-point connection channel, a Bluetooth connection channel, or a Wi-Fi STA connection channel.

In some possible implementations of the first aspect, before the obtaining to-be-synchronized data of a first application in the first electronic device, the method further includes:

allocating a second channel identifier to the first application; broadcasting the second channel identifier to at least one second electronic device, where the second channel identifier is used to indicate the second electronic device to establish a connection channel with the first electronic device, record a correspondence between a second channel identifier and a connection channel, and allocate the first channel identifier to the second application; receiving the first channel identifier sent by one or more second electronic devices; and establishing a correspondence between each first channel identifier and a corresponding connection channel.

In this implementation, the first electronic device allocates the second channel identifier to the first application in the first electronic device, and notifies the one or more second electronic devices of the second channel identifier. After obtaining the second channel identifier of the first electronic device, the second electronic device may establish the connection channel with the first electronic device by using the second channel identifier. In addition, each second electronic device may allocate the first channel identifier to the second application in the second electronic device, and transmit the first channel identifier to the first electronic device through the established connection channel. In this way, the first electronic device may learn of the first channel identifier of the second electronic device and the connection channel corresponding to the first channel identifier. Subsequently, if the first electronic device needs to synchronize data to a second application in a second electronic device, the first electronic device may determine a connection channel by using the first channel identifier of the second electronic device, and synchronize the data to the second application in the second electronic device through the connection channel.

It should be noted that not only the first electronic device records the first channel identifier of each second electronic device and the connection channel corresponding to each first channel identifier, but also the second electronic device may record the second channel identifier of the first electronic device and the connection channel corresponding to the second channel identifier. In this way, the first electronic device may synchronize data to the second electronic device by using the first channel identifier, and the second electronic device may also synchronize data to the first electronic device by using the second channel identifier.

In some possible implementations of the first aspect, the first channel identifier includes identification information of the second electronic device and identification information of the first application; and the second channel identifier includes identification information of the first electronic device and identification information of the first application.

It may be ensured that the identification information of the first electronic device and the identification information of the second electronic device are unique, and are used to distinguish between electronic devices. The identification information of the first application and the identification information of the second application may be used to distinguish between applications, and may be used to distinguish between same applications of a plurality of users.

It should be noted that, data of the first application in the first electronic device may be synchronized to second applications in one or more second electronic devices, and data of the second applications in the one or more second electronic devices may also be synchronized to the first application in the first electronic device. Therefore, in some possible implementations of the first aspect, the method further includes:

receiving second to-be-synchronized data that is of the second application and that is sent by the second electronic device through a connection channel corresponding to the second channel identifier; and synchronizing the second to-be-synchronized data to the first application.

In this implementation, after determining, based on a pre-stored second channel identifier of the first electronic device, a connection channel corresponding to the second channel identifier, the second electronic device transmits, to the first electronic device through the connection channel, data that needs to be synchronized. Then, the first electronic device synchronizes, to the first application of the first electronic device, the received data that needs to be synchronized.

By way of example but not limitation, the first electronic device is a mobile phone, and the second electronic device includes a tablet and a smart large screen. In this case, the mobile phone may be used as a master device, and the tablet and the smart large screen may be used as slave devices. In this case, the master device may synchronize data to the slave device based on the channel identifier. The slave device may also synchronize data to the master device based on the channel identifier. Specifically, both the tablet and the smart large screen record a second channel identifier of the mobile phone and a connection channel corresponding to the second channel identifier. When the tablet and the smart large screen need to synchronize data to the mobile phone, the tablet and the smart large screen may first determine, based on the first electronic device that needs to perform synchronization, a second channel identifier corresponding to the first electronic device, and then synchronize the data to the first electronic device through a connection channel corresponding to the second channel identifier.

In some possible implementations of the first aspect, the method further includes: receiving indication information sent by the second electronic device through the connection channel corresponding to the second channel identifier, where the indication information is used to indicate to transmit the second to-be-synchronized data to another second electronic device, and the another second electronic device is an electronic device other than the second electronic device that sends the second to-be-synchronized data in a plurality of second electronic devices.

After the receiving second to-be-synchronized data that is of the second application and that is sent by the second electronic device through a connection channel corresponding to the second channel identifier, the method further includes:

determining a first channel identifier of the another second electronic device; determining a connection channel corresponding to the first channel identifier of the another second electronic device; and transmitting the second to-be-synchronized data to the another second electronic device through the connection channel corresponding to the first channel identifier of the another second electronic device, to indicate the another second electronic device to synchronize the second to-be-synchronized data to a second application in the another second electronic device.

In this implementation, in addition to synchronizing data to the first electronic device, one or more second electronic devices may further synchronize data to the another second electronic device.

It should be noted that the indication information used to indicate to transmit the second to-be-synchronized data to the another second electronic device may be carried in the second to-be-synchronized data, or may not be carried in the second to-be-synchronized data.

By way of example but not limitation, the first electronic device is a mobile phone, and the second electronic device includes a tablet and a smart large screen. In this case, the mobile phone may be used as a master device, and the tablet and the smart large screen may be used as slave devices. In this case, the slave device may not only synchronize data to the master device based on the channel identifier, but also synchronize the data to another slave device. Specifically, the tablet may synchronize the second to-be-synchronized data to the mobile phone based on the second channel identifier, and may indicate the mobile phone to synchronize the second to-be-synchronized data to the smart large screen. The mobile phone records a first channel identifier corresponding to the smart large screen and a corresponding connection channel. Based on this, after receiving the indication information from the tablet, the mobile phone may synchronize the second to-be-synchronized data to the smart large screen.

In some possible implementations of the first aspect, before the receiving second to-be-synchronized data that is of the second application and that is sent by the second electronic device through a connection channel corresponding to the second channel identifier, the method further includes:

determining whether to allow receiving of the second to-be-synchronized data; and if receiving of the second to-be-synchronized data is allowed, entering the step of receiving second to-be-synchronized data that is of the second application and that is sent by the second electronic device through a connection channel corresponding to the second channel identifier; or if receiving of the second to-be-synchronized data is not allowed, recording log information.

In some possible implementations of the first aspect, the determining whether to allow receiving of the second to-be-synchronized data includes:

determining a first target data type of the second to-be-synchronized data; determining whether a first receiving option corresponding to the first target data type is in an on state; and if the first receiving option is in the on state, determining to allow receiving of the second to-be-synchronized data; or if the first receiving option is in an off state, determining not to allow receiving of the second to-be-synchronized data, where each data type corresponds to one receiving option.

In some possible implementations of the first aspect, before the determining a first channel identifier, the method further includes:

determining whether to allow sending of the first to-be-synchronized data; and if sending of the first to-be-synchronized data is allowed, entering the step of determining a first channel identifier.

In some possible implementations of the first aspect, the determining whether to allow sending of the first to-be-synchronized data includes:

determining a second target data type of the first to-be-synchronized data; determining whether a first sending option corresponding to the second target data type is in an on state; and if the first sending option is in the on state, determining to allow sending of the first to-be-synchronized data; or if the first sending option is in an off state, determining not to allow sending of the first to-be-synchronized data, where each data type corresponds to one sending option.

In some possible implementations of the first aspect, the data type includes at least one of a message, an object, a large byte, a file, and a stream.

In some possible implementations of the first aspect, the method further includes:

obtaining a setting instruction of a first synchronization option, where the first synchronization option includes the first receiving option and the first sending option; and setting the first synchronization option based on a data type, a synchronization action, and an option setting value in the setting instruction, where the synchronization action includes data sending and data receiving.

It should be noted that, a data sending option and a data receiving option are provided for each data type, so that convenience of a data synchronization operation performed by an application can be improved.

According to a second aspect, an embodiment of this application provides a data synchronization method, applied to a second electronic device. The method includes:

receiving, through a connection channel corresponding to a second channel identifier, first to-be-synchronized data sent by a first electronic device, where the second channel identifier is an identifier allocated by the first electronic device to a first application, the first electronic device includes the first application, and the first to-be-synchronized data is data of the first application; and synchronizing the first to-be-synchronized data to a second application, where the second electronic device includes the second application.

In some possible implementations of the second aspect, before the receiving, through a connection channel corresponding to a second channel identifier, first to-be-synchronized data sent by a first electronic device, the method further includes:

receiving the second channel identifier broadcast by the first electronic device, where each second channel identifier corresponds to one first electronic device; establishing a connection channel with the first electronic device based on the second channel identifier; allocating a first channel identifier to the second application; and transmitting the first channel identifier to the first electronic device through the connection channel established based on the second channel identifier.

In some possible implementations of the second aspect, before the receiving, through a connection channel corresponding to a second channel identifier, first to-be-synchronized data sent by a first electronic device, the method further includes:

determining whether to allow receiving of the first to-be-synchronized data; and if receiving of the first to-be-synchronized data is allowed, entering the step of receiving, through a connection channel corresponding to a second channel identifier, first to-be-synchronized data sent by a first electronic device.

In some possible implementations of the second aspect, the determining whether to allow receiving of the first to-be-synchronized data includes;

determining a third target data type of the first to-be-synchronized data; determining whether a second receiving option corresponding to the third target data type is in an on state; and if the second receiving option is in the on state, determining to allow receiving of the first to-be-synchronized data; or if the second receiving option is in an off state, determining not to allow receiving of the first to-be-synchronized data, where each data type corresponds to one receiving option.

In some possible implementations of the second aspect, the method further includes:

obtaining second to-be-synchronized data of the second application; and transmitting the second to-be-synchronized data to the first electronic device through the connection channel corresponding to the second channel identifier, to indicate the first electronic device to synchronize the second to-be-synchronized data to the first application.

In some possible implementations of the second aspect, before the transmitting the second to-be-synchronized data to the first electronic device through the connection channel corresponding to the second channel identifier, the method further includes:

determining whether to allow sending of the second to-be-synchronized data; and if sending of the second to-be-synchronized data is allowed, entering the step of transmitting the second to-be-synchronized data to the first electronic device through the connection channel corresponding to the second channel identifier.

In some possible implementations of the second aspect, the determining whether to allow sending of the second to-be-synchronized data includes:

determining a fourth target data type of the second to-be-synchronized data; determining whether a second sending option of the fourth target data type is in an on state; and if the second sending option is in the on state, determining to allow sending of the second to-be-synchronized data; or if the second sending option is in an off state, determining not to allow sending of the second to-be-synchronized data, where each data type corresponds to one sending option.

In some possible implementations of the second aspect, the method further includes:

obtaining a setting instruction of a second synchronization option, where the second synchronization option includes the second receiving option and the second sending option; and setting the second synchronization option based on a data type, a synchronization action, and an option setting value in the setting instruction, where the synchronization action includes data sending and data receiving.

In some possible implementations of the second aspect, the first channel identifier includes identification information of the second electronic device and identification information of the first application; and the second channel identifier includes identification information of the first electronic device and identification information of the first application.

In some possible implementations of the second aspect, the data type includes at least one of a message, an object, a large byte, a file, and a stream.

According to a third aspect, an embodiment of this application provides a data synchronization method, applied to a second electronic device. The method includes:

obtaining third to-be-synchronized data of a second application, where the second electronic device includes the second application: determining a second channel identifier, where the second channel identifier is an identifier allocated by a first electronic device to a first application, the first electronic device includes the first application, and each second channel identifier corresponds to one first electronic device; determining a connection channel corresponding to the second channel identifier, where the connection channel is a connection channel that has been established between the first electronic device and the second electronic device, and each second channel identifier corresponds to one connection channel; and transmitting the third to-be-synchronized data to the first electronic device through the connection channel corresponding to the second channel identifier, to indicate the first electronic device to synchronize the third to-be-synchronized data to the first application.

It should be noted that the third to-be-synchronized data is data that needs to be synchronized by the second application in the second electronic device to the first application in the first electronic device.

In some possible implementations of the third aspect, before the obtaining third to-be-synchronized data of a second application, the method further includes:

receiving the second channel identifier broadcast by the first electronic device; establishing a connection channel with the first electronic device based on the second channel identifier; allocating a first channel identifier to the second application; and transmitting the first channel identifier to the first electronic device through the connection channel established based on the second channel identifier.

In some possible implementations of the third aspect, the method further includes:

sending, to the first electronic device, indication information used to indicate to transmit the third to-be-synchronized data to another second electronic device, where the another second electronic device is an electronic device other than the second electronic device that sends the third to-be-synchronized data in a plurality of second electronic devices.

According to a fourth aspect, an embodiment of this application provides a data synchronization method, applied to a first electronic device. The method includes:

receiving, through a connection channel corresponding to a first channel identifier, third to-be-synchronized data sent by a second electronic device, where the first channel identifier is an identifier allocated by the second electronic device to a second application, the second electronic device includes the second application, and the third to-be-synchronized data is data of the second application; and synchronizing the third to-be-synchronized data to a first application, where the first electronic device includes the first application.

It may be understood that the data synchronization method in the fourth aspect corresponds to the data synchronization method in the third aspect. The third aspect shows a procedure on a side of the second electronic device, and the fourth aspect shows a procedure on a side of the first electronic device.

In the data synchronization methods in the third aspect and the fourth aspect, after processes of initializing the channel identifier and registering a slave device with a master device are completed, the slave device first synchronizes data to the master device, and then the master device synchronizes data to the slave device. That is, the second electronic device first synchronizes the data to the first electronic device, and then the first electronic device synchronizes the data to the second electronic device. In the data synchronization methods in the first aspect and the second aspect, after processes of initializing the channel identifier and registering a slave device with a master device are completed, the first electronic device first synchronizes data to the second electronic device, and then the second electronic device synchronizes data to the first electronic device.

In some possible implementations of the fourth aspect, before the receiving, through a connection channel corresponding to a first channel identifier, third to-be-synchronized data sent by a second electronic device, the method further includes:

allocating a second channel identifier to the first application; broadcasting the second channel identifier to one or more second electronic devices, where the second channel identifier is used to indicate the second electronic device to establish a connection channel with the first electronic device, record a correspondence between a second channel identifier and a connection channel, and allocate the first channel identifier to the second application: receiving the first channel identifier sent by the one or more second electronic devices; and establishing a correspondence between each first channel identifier and a corresponding connection channel.

According to a fifth aspect, an embodiment of this application provides a data synchronization apparatus, applied to a first electronic device. The apparatus may include:

a first obtaining module, configured to obtain first to-be-synchronized data of a first application, where the first electronic device includes the first application;

a first determining module, configured to determine a first channel identifier, where the first channel identifier is an identifier allocated by a second electronic device to a second application, the second electronic device includes the second application, and each first channel identifier corresponds to one second electronic device;

a first channel determining module, configured to determine a connection channel corresponding to the first channel identifier, where the connection channel is a connection channel that has been established between the first electronic device and the second electronic device, and each first channel identifier corresponds to one connection channel; and a first synchronization module, configured to transmit the first to-be-synchronized data to the second electronic device through the connection channel corresponding to the first channel identifier, to indicate the second electronic device to synchronize the first to-be-synchronized data to the second application.

In some possible implementations of the fifth aspect, the apparatus further includes:

a first channel identifier allocation module, configured to: allocate a second channel identifier to the first application; broadcast the second channel identifier to one or more second electronic devices, where the second channel identifier is used to indicate the second electronic device to establish a connection channel with the first electronic device, record a correspondence between a second channel identifier and a connection channel, and allocate the first channel identifier to the second application; receive the first channel identifier sent by the one or more second electronic devices; and establish a correspondence between each first channel identifier and a corresponding connection channel.

In some possible implementations of the fifth aspect, the first channel identifier includes identification information of the second electronic device and identification information of the first application; and the second channel identifier includes identification information of the first electronic device and identification information of the first application.

In some possible implementations of the fifth aspect, the apparatus further includes:

a second synchronization module, configured to: receive second to-be-synchronized data that is of the second application and that is sent by the second electronic device through a connection channel corresponding to the second channel identifier; and synchronize the second to-be-synchronized data to the first application.

In some possible implementations of the fifth aspect, the apparatus further includes:

an indication information receiving module, configured to receive indication information sent by the second electronic device through the connection channel corresponding to the second channel identifier, where the indication information is used to indicate to transmit the second to-be-synchronized data to another second electronic device, and the another second electronic device is an electronic device other than the second electronic device that sends the second to-be-synchronized data in a plurality of second electronic devices; and a third synchronization module, configured to: determine a first channel identifier of the another second electronic device; determine a connection channel corresponding to the first channel identifier of the another second electronic device; and transmit the second to-be-synchronized data to the another second electronic device through the connection channel corresponding to the first channel identifier of the another second electronic device, to indicate the another second electronic device to synchronize the second to-be-synchronized data to a second application in the another second electronic device.

In some possible implementations of the fifth aspect, the apparatus further includes:

a first receiving determining module, configured to: determine whether to allow receiving of the second to-be-synchronized data; and if receiving of the second to-be-synchronized data is allowed, enter the step of receiving second to-be-synchronized data that is of the second application and that is sent by the second electronic device through a connection channel corresponding to the second channel identifier.

In some possible implementations of the fifth aspect, the first receiving determining module is specifically configured to: determine a first target data type of the second to-be-synchronized data; determine whether a first receiving option corresponding to the first target data type is in an on state; and if the first receiving option is in the on state, determine to allow receiving of the second to-be-synchronized data; or if the first receiving option is in an off state, determine not to allow receiving of the second to-be-synchronized data, where each data type corresponds to one receiving option.

In some possible implementations of the fifth aspect, the apparatus further includes a first sending determining module, configured to: determine whether to allow sending of the first to-be-synchronized data; and if sending of the first to-be-synchronized data is allowed, enter the step of determining a first channel identifier.

In some possible implementations of the fifth aspect, the first sending determining module is specifically configured to: determine a second target data type of the first to-be-synchronized data; determine whether a first sending option corresponding to the second target data type is in an on state; and if the first sending option is in the on state, determine to allow sending of the first to-be-synchronized data; or if the first sending option is in an off state, determine not to allow sending of the first to-be-synchronized data, where each data type corresponds to one sending option.

In some possible implementations of the fifth aspect, the data type includes at least one of a message, an object, a large byte, a file, and a stream.

In some possible implementations of the fifth aspect, the apparatus further includes a first synchronization option setting module, configured to: obtain a setting instruction of a first synchronization option, where the first synchronization option includes the first receiving option and the first sending option; and set the first synchronization option based on a data type, a synchronization action, and an option setting value in the setting instruction, where the synchronization action includes data sending and data receiving.

The data synchronization apparatus has a function of implementing the data synchronization method in the first aspect. The function may be implemented by hardware, or may be implemented by hardware executing corresponding software. The hardware or software includes one or more modules corresponding to the foregoing function, and the module may be software and/or hardware.

According to a sixth aspect, an embodiment of this application provides a data synchronization apparatus, applied to a second electronic device. The apparatus includes:

- a first receiving module, configured to receive, through a connection channel corresponding to a second channel identifier, first to-be-synchronized data sent by a first electronic device, where the second channel identifier is an identifier allocated by the first electronic device to a first application, the first electronic device includes the first application, and the first to-be-synchronized data is data of the first application; and
- a fourth synchronization module, configured to synchronize the first to-be-synchronized data to a second application, where the second electronic device includes the second application.

In some possible implementations of the sixth aspect, the apparatus further includes:

- a second channel identifier allocation module, configured to: receive the second channel identifier broadcast by the first electronic device, where each second channel identifier corresponds to one first electronic device; establish a connection channel with the first electronic device based on the second channel identifier; allocate a first channel identifier to the second application; and transmit the first channel identifier to the first electronic device through the connection channel established based on the second channel identifier.

In some possible implementations of the sixth aspect, the apparatus further includes:

- a second receiving determining module, configured to: determine whether to allow receiving of the first to-be-synchronized data; and if receiving of the first to-be-synchronized data is allowed, enter the step of receiving, through a connection channel corresponding to a second channel identifier, first to-be-synchronized data sent by a first electronic device.

In some possible implementations of the sixth aspect, the second receiving determining module is specifically configured to:

- determine a third target data type of the first to-be-synchronized data; determine whether a second receiving option corresponding to the third target data type is in an on state; and if the second receiving option is in the on state, determine to allow receiving of the first to-be-synchronized data; or if the second receiving option is in an off state, determine not to allow receiving of the first to-be-synchronized data, where each data type corresponds to one receiving option.

In some possible implementations of the sixth aspect, the apparatus further includes:

- a fifth synchronization module, configured to: obtain second to-be-synchronized data of the second application; and transmit the second to-be-synchronized data to the first electronic device through the connection channel corresponding to the second channel identifier, to indicate the first electronic device to synchronize the second to-be-synchronized data to the first application.

In some possible implementations of the sixth aspect, the apparatus further includes:

- a second sending determining module, configured to: determine whether to allow sending of the second to-be-synchronized data; and if sending of the second to-be-synchronized data is allowed, enter the step of transmitting the second to-be-synchronized data to the first electronic device through the connection channel corresponding to the second channel identifier.

In some possible implementations of the sixth aspect, the second sending determining module is specifically configured to:

- determine a fourth target data type of the second to-be-synchronized data; determine whether a second sending option of the fourth target data type is in an on state; and if the second sending option is in the on state, determine to allow sending of the second to-be-synchronized data; or if the second sending option is in an off state, determine not to allow sending of the second to-be-synchronized data, where each data type corresponds to one sending option.

In some possible implementations of the sixth aspect, the apparatus further includes:

- a second synchronization option setting module, configured to: obtain a setting instruction of a second synchronization option, where the second synchronization option includes the second receiving option and the second sending option; and set the second synchronization option based on a data type, a synchronization action, and an option setting value in the setting instruction, where the synchronization action includes data sending and data receiving.

In some possible implementations of the sixth aspect, the first channel identifier includes identification information of the second electronic device and identification information of the first application; and the second channel identifier includes identification information of the first electronic device and identification information of the first application.

In some possible implementations of the sixth aspect, the data type includes at least one of a message, an object, a large byte, a file, and a stream.

The data synchronization apparatus has a function of implementing the data synchronization method in the second aspect. The function may be implemented by hardware, or may be implemented by hardware executing corresponding software. The hardware or software includes one or more modules corresponding to the foregoing function, and the module may be software and/or hardware.

According to a seventh aspect, an embodiment of this application provides a data synchronization apparatus, applied to a second electronic device. The apparatus includes:

- a second obtaining module, configured to obtain third to-be-synchronized data of a second application, where the second electronic device includes the second application;

a second determining module, configured to determine a second channel identifier, where the second channel identifier is an identifier allocated by a first electronic device to a first application, the first electronic device includes the first application, and each second channel identifier corresponds to one first electronic device;

a second channel determining module, configured to determine a connection channel corresponding to the second channel identifier, where the connection channel is a connection channel that has been established between the first electronic device and the second electronic device, and each second channel identifier corresponds to one connection channel; and a sixth synchronization module, configured to transmit the third to-be-synchronized data to the first electronic device through the connection channel corresponding to the second channel identifier, to indicate the first electronic device to synchronize the third to-be-synchronized data to the first application.

In some possible implementations of the seventh aspect, the apparatus may further include:

a third channel identifier allocation module, configured to: receive the second channel identifier broadcast by the first electronic device; and establish a connection channel with the first electronic device based on the second channel identifier; allocate a first channel identifier to the second application; and transmit the first channel identifier to the first electronic device through the connection channel established based on the second channel identifier.

In some possible implementations of the seventh aspect, the apparatus further includes:

an indication information sending module, configured to send, to the first electronic device, indication information used to indicate to transmit the third to-be-synchronized data to another second electronic device, where the another second electronic device is an electronic device other than the second electronic device that sends the third to-be-synchronized data in a plurality of second electronic devices.

The data synchronization apparatus has a function of implementing the data synchronization method in the third aspect. The function may be implemented by hardware, or may be implemented by hardware executing corresponding software. The hardware or software includes one or more modules corresponding to the foregoing function, and the module may be software and/or hardware.

According to an eighth aspect, an embodiment of this application provides a data synchronization apparatus, applied to a first electronic device. The apparatus includes:

a second receiving module, configured to receive, through a connection channel corresponding to a first channel identifier, third to-be-synchronized data sent by a second electronic device, where the first channel identifier is an identifier allocated by the second electronic device to a second application, the second electronic device includes the second application, and the third to-be-synchronized data is data of the second application; and a seventh synchronization module, configured to synchronize the third to-be-synchronized data to a first application, where the first electronic device includes the first application.

In some possible implementations of the eighth aspect, the apparatus further includes.

a fourth channel identifier allocation module, configured to: allocate a second channel identifier to the first application; broadcast the second channel identifier to one or more second electronic devices, where the second channel identifier is used to indicate the second electronic device to establish a connection channel with the first electronic device, record a correspondence between a second channel identifier and a connection channel, and allocate the first channel identifier to the second application; receive the first channel identifier sent by the one or more second electronic devices; and establish a correspondence between each first channel identifier and a corresponding connection channel.

The data synchronization apparatus has a function of implementing the data synchronization method in the fourth aspect. The function may be implemented by hardware, or may be implemented by hardware executing corresponding software. The hardware or software includes one or more modules corresponding to the foregoing function, and the module may be software and/or hardware.

According to a ninth aspect, an embodiment of this application provides an electronic device, including a memory, a processor, and a computer program that is stored in the memory and that can be run on the processor. When executing the computer program, the processor implements the method according to any one of the first aspect, the second aspect, the third aspect, or the fourth aspect.

According to a tenth aspect, an embodiment of this application provides a computer-readable storage medium. The computer-readable storage medium stores a computer program, and when the computer program is executed by a processor, the method according to any one of the first aspect, the second aspect, the third aspect, or the fourth aspect is implemented.

According to an eleventh aspect, an embodiment of this application provides a chip system. The chip system includes a processor, the processor is coupled to a memory, and the processor executes a computer program stored in the memory, to implement the method according to any one of the first aspect, the second aspect, the third aspect, or the fourth aspect. The chip system may be a single chip or a chip module including a plurality of chips.

According to a twelfth aspect, an embodiment of this application provides a computer program product. When the computer program product runs on an electronic device, the electronic device is enabled to perform the method according to any one of the first aspect, the second aspect, the third aspect, or the fourth aspect.

It may be understood that, for beneficial effects of the second aspect to the twelfth aspect, refer to related descriptions in the first aspect. Details are not described herein again.

DESCRIPTION OF EMBODIMENTS

In the following descriptions, for illustration instead of limitation, specific details such as a particular system structure and a technology are provided to make a thorough understanding of embodiments of this application.

In embodiments of this application, cross-device application data synchronization in a near field environment can be implemented based on a channel identifier allocated to an application. In other words, in embodiments of this application, data synchronization between a plurality of electronic devices in the near field environment, for example, data synchronization between a mobile phone, a tablet, and a smart large screen or data synchronization between mobile phones, can be implemented without depending on a cloud server and an account login mechanism.

In embodiments of this application, a plurality of electronic devices are in a near field environment. In other words, a connection channel between the plurality of electronic devices may be a near field communication channel, for example, Bluetooth communication, Wi-Fi point-to-point communication, and a Wi-Fi station. Data synchronization between the plurality of electronic devices is implemented through the connection channel between the electronic devices based on a channel identifier pre-allocated to an application. Based on this, the electronic device does not need to be connected to the Internet, or the electronic device does not need to access the Internet. Certainly, the electronic device does not need to log in to a platform account, an application account, or the like.

A type of the electronic device in embodiments of this application may be random. The electronic device may include but is not limited to a mobile phone, a tablet computer, a smart large screen (which may also be referred to as a smart television), a wearable device, and the like.

Figure 1:
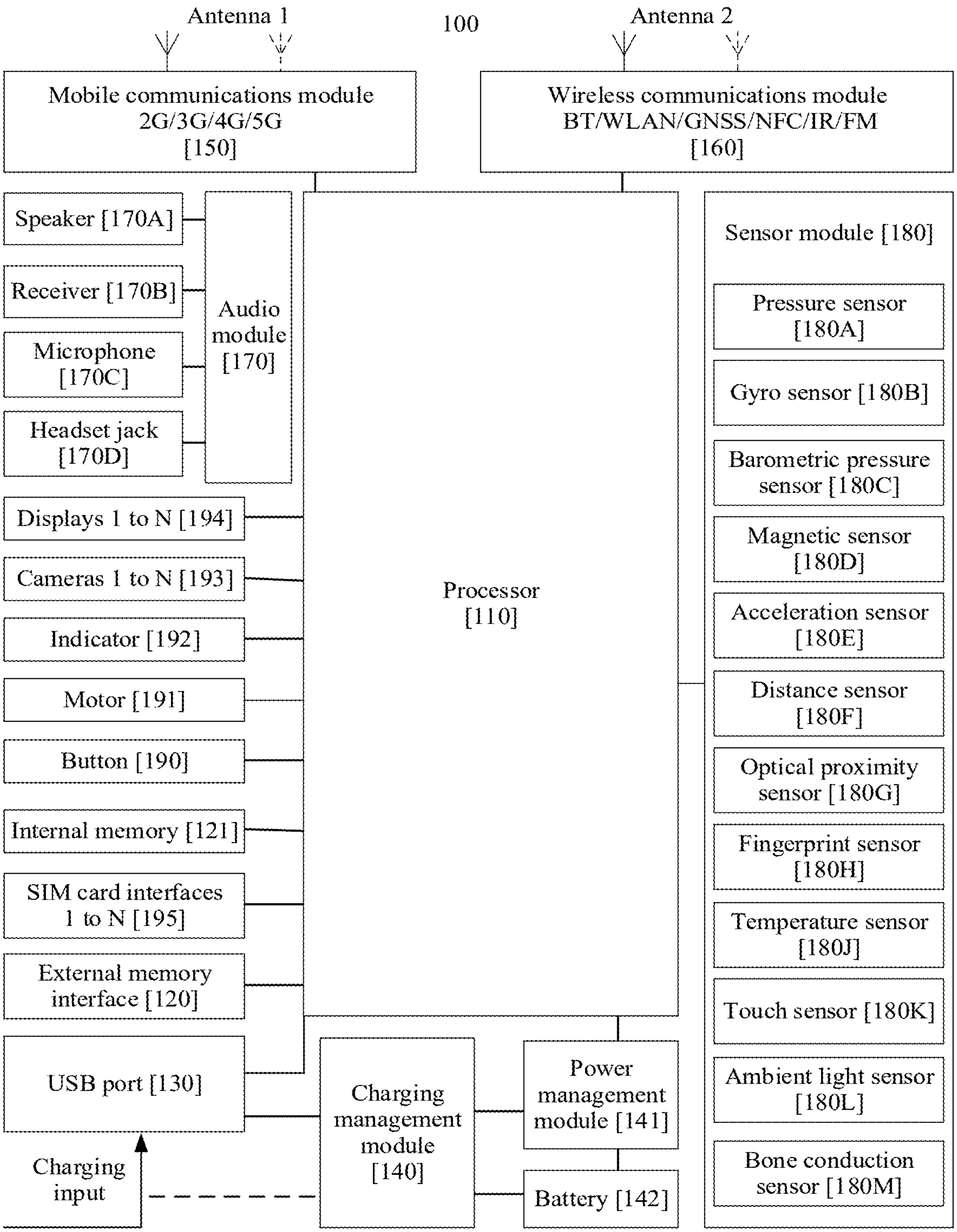
FIG. 1 is a schematic diagram of a hardware architecture of an electronic device 100 according to an embodiment of this application.

By way of example but not limitation, as shown in FIG. 1, the electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronous serial bus, including a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170.

The PCM interface may also be used for audio communication, and samples, quantizes, and codes an analog signal. In some embodiments, the audio module 170 may be coupled to the wireless communications module 160 through a PCM bus interface. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB Type-C port, or the like. The USB port 130 may be configured to connect to a charger to charge the electronic device 100, or may be configured to transmit data between the electronic device 100 and a peripheral device, or may be configured to connect to a headset for playing audio through the headset. The port may alternatively be configured to connect to another electronic device such as an AR device.

It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert an amplified signal into an electromagnetic wave for radiation through the antenna 1. In some embodiments, at least some functional modules in the mobile communications module 150 may be disposed in the processor 110. In some embodiments, at least some functional modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system. GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to a DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, by referring to a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer executable program code. The executable program code includes instructions. The processor 110 performs various function applications of the electronic device 100 and data processing by running the instructions stored in the internal memory 121. The internal memory 121 may include a program storage area and a data storage area. The program storage area may store an operating system, an application required by at least one function (for example, a sound playing function or an image playing function), and the like. The data storage area may store data (for example, audio data or an address book) created during use of the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules in the audio module 170 are disposed in the processor 110.

The speaker 170A, also referred to as a "horn", is configured to convert an electrical audio signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input the sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change of the capacitance. When a touch operation is performed on the display 194, the electronic device 100 detects intensity of the touch operation based on the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is performed. When a touch operation whose touch operation intensity is greater than or equal to the first pressure threshold is performed on the Messages application icon, an instruction for creating a new SMS message is performed.

The gyro sensor 180B may be configured to determine a motion posture of the electronic device 100. In some embodiments, an angular velocity of the electronic device 100 around three axes (namely, x, y, and z axes) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a motion-sensing gaming scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the flip cover.

The acceleration sensor 180E may detect magnitudes of accelerations of the electronic device 100 in various directions (usually on three axes), and may detect a magnitude and a direction of gravity when the electronic device 100 is still. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor near the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture.

After the hardware architecture of the electronic device is described, the following describes a software system architecture of the electronic device.

A software system of the electronic device 100 may use a layered architecture, an event-driven architecture, a micro-kernel architecture, a micro service architecture, or a cloud architecture. In embodiments of this application, a layered architecture is used as an example to describe a software structure of the electronic device 100.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include some application packages. For example, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions. For example, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like. The content provider is configured to: store and obtain data, and enable the data to be accessed by an application. The data may include a video, an image, an audio, calls that are made and answered, a browsing history and bookmarks, an address book, and the like. The view system includes a visual control, such as a control for displaying a text or a control for displaying a picture. The view system may be configured to construct an application. A display interface may include one or more views. For example, a display interface including an SMS message notification icon may include a text display view and a picture display view. The phone manager is configured to provide a communication function of the electronic device 100, for example, management of a call status (including answering or declining). The resource manager provides various resources such as a localized character string, an icon, a picture, a layout file, and a video file, for an application.

The notification manager enables an application to display notification information in a status bar, and may be configured to convey a notification type message. The notification manager may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an announcement is produced, the electronic device vibrates, or an indicator light blinks.

The Android runtime includes a core library and a virtual machine. The Android runtime is responsible for scheduling and management of the Android system.

The core library includes two parts: a function that needs to be invoked in Java language, and a core library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The kernel layer is a layer between hardware and software. The kernel layer includes at least a display driver, a camera driver, an audio driver, and a sensor driver.

Figure 2:
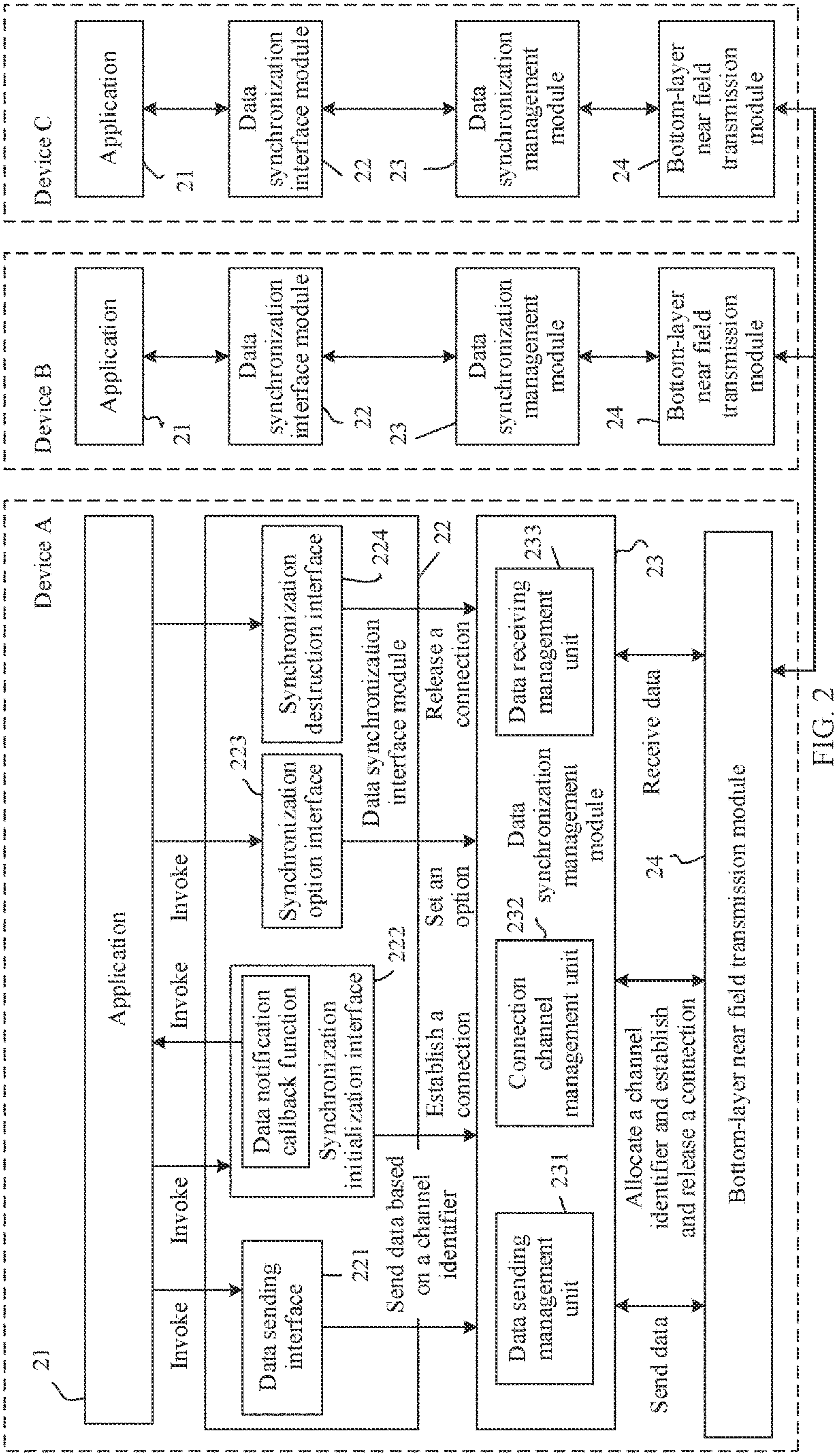
FIG. 2 is a schematic diagram of a software architecture of an electronic device 100 according to an embodiment of this application.

In this embodiment of this application, the software system architecture of the electronic device may be shown in FIG. 2.

As shown in FIG. 2, the application layer includes an application 21, and the application framework layer may include a data synchronization interface module 22 and a data synchronization management module 23. The data synchronization interface module 22 may include a data sending interface 221, a synchronization initialization interface 222, a synchronization option interface 223, and a synchronization destruction interface 224. The data synchronization management module 23 may include a data sending management unit 231, a connection channel management unit 232, and a data receiving management unit 233. The software system architecture further includes a bottom-layer near field transmission module 24. For example, the bottom-layer near field transmission module 24 manages a near field communication connection channel. The near field communication connection channel may include but is not limited to Wi-Fi point-to-point, Wi-Fi STA, Bluetooth, and the like.

The bottom-layer near field transmission module 24 is integrated at a bottom layer, and an application may not need to sense the bottom-layer near field transmission module 24. The bottom-layer near field transmission module 24 may centrally manage communication manners such as Wi-Fi point-to-point, Wi-Fi STA, and Bluetooth established by the electronic device. In addition, the bottom-layer near field transmission module may further allocate a channel identifier to an application based on the electronic device and the application. The application only needs to use the channel identifier when transmitting data, and does not need to pay attention to transmission information such as an IP address, a Bluetooth address, and a socket object at the bottom layer.

The data synchronization interface module 22 may be invoked by the application 21. The application 21 may perform device registration with the bottom-layer near field transmission module 24 by invoking the synchronization initialization interface 222. Specifically, if the application invokes the synchronization initialization interface, it indicates that a current application needs to be registered with a data synchronization framework. The data synchronization framework may include a data synchronization interface module, a data synchronization management module, and a bottom-layer near field transmission module. After the application invokes the synchronization initialization interface, the bottom-layer near field transmission module 24 may allocate a channel identifier to the application. The channel identifier may include two parts: one is a device identifier, and the other is an application identifier. The device identifier may be used to distinguish between electronic devices, and the application identifier is used to distinguish between applications.

Usually, a device that first invokes a synchronization initialization interface may be referred to as a master device, and a device that subsequently invokes a synchronization initialization interface may be referred to as a slave device. For example, a near field environment includes three electronic devices; a mobile phone, a tablet, and a smart large screen. If the mobile phone first invokes a synchronization initialization interface of the mobile phone, the mobile phone is used as a master device, and the tablet and the smart large screen are used as slave devices.

After invoking the synchronization initialization interface, an application in the master device may obtain a channel identifier allocated to the application. The master device may broadcast the channel identifier of the application to one or more surrounding electronic devices, to notify the surrounding electronic devices of related information of the master device. If a surrounding electronic device expects to receive synchronization data of the master device, or expects to synchronize data to the master device, the surrounding electronic device may record a channel identifier of the master device, establish a connection channel with the master device based on related information such as a device identifier in the channel identifier broadcast by the master device, and record a correspondence between a channel identifier broadcast by the master device and a connection channel.

In addition, an application in the slave device may also invoke a synchronization initialization interface of the slave device to obtain a channel identifier allocated by a bottom-layer near field transmission module of the slave device. The slave device may transmit the channel identifier of the application in the slave device to the master device through a connection channel between the master device and the slave device. After receiving the channel identifier transmitted by the slave device, the master device may record a channel identifier of each slave device and a connection channel corresponding to the channel identifier of each slave device.

The master device and the slave device may obtain, by successively invoking the synchronization initialization interface 222, the channel identifier allocated to the application, and establish the connection channel between the master device and the slave device. In addition, the master device and the slave device each record a channel identifier of a device and a corresponding connection channel through data exchange. To be specific, the master device records a channel identifier sent by each slave device and a connection channel corresponding to the channel identifier, and the slave device records a channel identifier sent by the master device and a connection channel corresponding to the channel identifier.

A process in which the master device invokes the synchronization initialization interface 222 to obtain the channel identifier allocated by the bottom-layer near field transmission module 24, and broadcasts the channel identifier to a surrounding electronic device may be referred to as a process of initializing and allocating the channel identifier allocation process. After receiving the channel identifier broadcast by the master device, the slave device establishes a connection channel with the master device, allocates a channel identifier to the application in the slave device, and transmits the allocated channel identifier to the master device. A process in which the master device records the channel identifier of each slave device and the corresponding connection channel may be referred to as a process in which the slave device registers with the master device.

After the two processes of initializing and allocating the channel identifier and registering the slave device with the master device are completed, data synchronization may be performed between the master device and the slave device based on the channel identifier.

When the master device needs to synchronize data to the slave device, the master device may first determine the data that needs to be synchronized, determine a channel identifier based on the slave device that needs to perform synchronization, then invoke the data sending interface 221, and transmit, to the slave device based on the channel identifier of the slave device, the data that needs to be synchronized. Specifically, the master device may determine, from the recorded information, the connection channel corresponding to the channel identifier of each slave device, and then transmit, to a corresponding slave device through the connection channel, the data that needs to be synchronized. In this process, the application may not need to sense which applications on which devices in a networking environment need to perform data synchronization, and only needs to fill in data that expects to be synchronized. Then, the data synchronization interface module, the data synchronization management module, and the bottom-layer near field transmission module synchronize, to an application in the corresponding slave device, the data that expects to be synchronized.

Similarly, if the slave device needs to synchronize data to the master device, the slave device may also synchronize the data to the application in the master device by using the data synchronization interface module, the data synchronization management module, and the bottom-layer near field transmission module of the slave device based on the channel identifier that is of the master device and that is recorded by the slave device and the connection channel corresponding to the channel identifier.

The master device and the slave device may implement a data receiving function by using a data notification callback function in the synchronization initialization interface 222. To be specific, after an electronic device receives data synchronized by another device, the data notification callback function is triggered, so that an application in the electronic device responds to the data synchronized by the another device.

After data synchronization, the electronic device may deregister a corresponding application from the synchronization framework by invoking the synchronization destruction interface 224, that is, no longer perform a data synchronization operation of the application. To be specific, if the application invokes the synchronization destruction interface 224, it indicates that the application expects to deregister from the data synchronization framework, and subsequently does not synchronize data to another device, or refreshes a data change on another device to the electronic device. The synchronization destruction interface 224 is opposite to the synchronization initialization interface 222. The data synchronization initialization interface 222 is registered before data synchronization, and the synchronization destruction interface 224 is deregistered after data synchronization.

The synchronization option interface 223 may be configured to perform option control on sending or receiving of various types of data. Sending and receiving functions of various types of data are turned on by default. Based on an application requirement, a sending option or a receiving option of a corresponding type of data may be turned off.

The data synchronization management module 23 may be configured to: query an internal link channel, send and receive data, and the like. The connection channel management unit 223 may be configured to manage an established connection channel. Specifically, the connection channel management unit 223 may record all established connection channels of a current device and corresponding channel identifiers. If the device is a master device, the connection channel management unit 223 may record channel identifiers of all the slave devices. If the device is a slave device, the connection channel management unit 223 may record a channel identifier of the master device. The data sending management unit 231 may be configured to: allocate a thread to a data sending action, and transfer, to another device, one-time data or streaming data of data transfer. The data receiving management unit 233 may be configured to: allocate a thread to a data receiving action, perform buffer management on received data, and provide the data for an application for reading and subsequent operations after the data is received.

FIG. 2 shows the software system architecture of the electronic device in this embodiment of this application. In addition, a device A, a device B, and a device C in FIG. 2 each exchange data with another device by using a bottom-layer near field transmission module of the device. In each device, data exchange is performed between an application, a data synchronization interface module, a data synchronization management module, and a bottom-layer transmission module.

After the hardware architecture and the software architecture of the electronic device in embodiments of this application are described, the following describes a data synchronization process.

Figure 3:
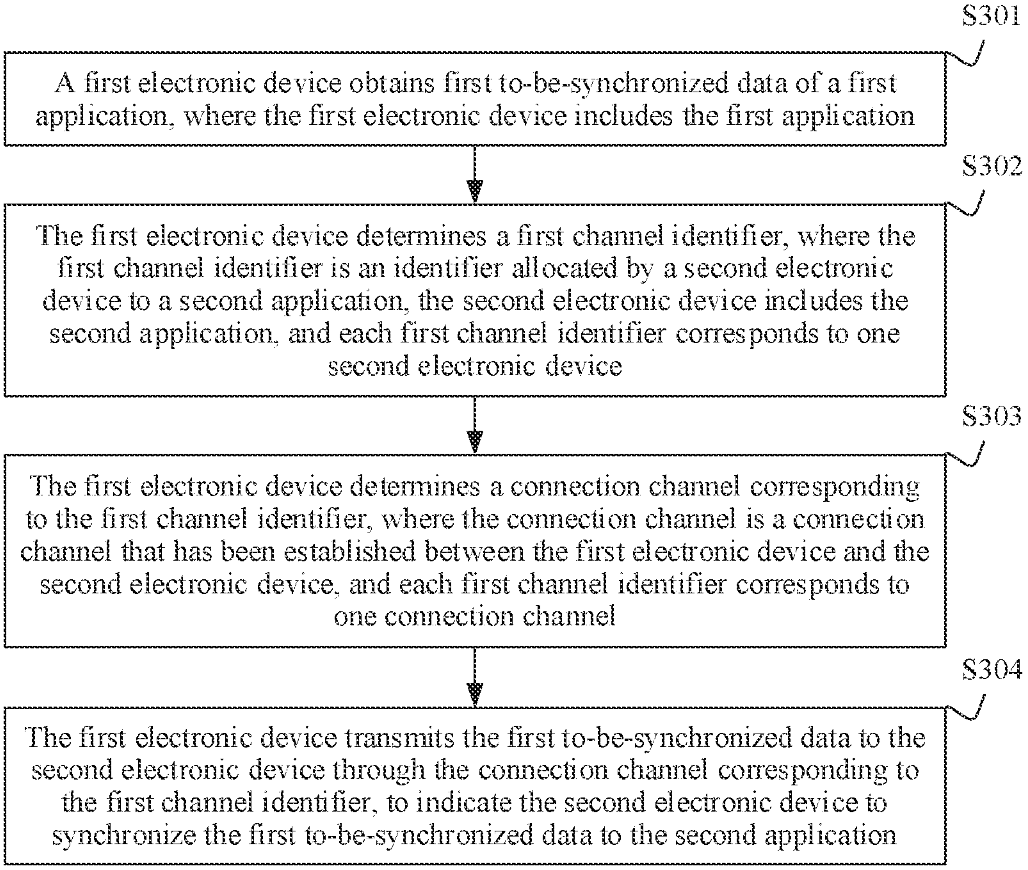
FIG. 3 is a schematic block diagram of a procedure of a data synchronization method according to an embodiment of this application.

FIG. 3 is a schematic block diagram of a procedure of a data synchronization method according to an embodiment of this application. The method may be applied to a first electronic device, and the method may include the following steps.

Step S301: The first electronic device obtains first to-be-synchronized data of a first application, where the first electronic device includes the first application.

It should be noted that the first to-be-synchronized data is data that needs to be synchronized to a second application in a second electronic device, and the data is data of the first application. When the first electronic device needs to synchronize data to the second application in the second electronic device, the first electronic device may first determine which data needs to be synchronized.

A data type of the first to-be-synchronized data may be random. By way of example but not limitation, the data type may include but is not limited to a message, an object, a large byte, a file, a stream, and the like. The message may be a single transient control instruction, the object may be a continuously changing instance, the large byte may be a byte array with a large length, the file may be a specific file at a local location, and the stream may be a data stream that is subsequently written intermittently.

The first electronic device may be used as a master device, and the second electronic device is correspondingly a slave device. The first electronic device (the master device) synchronizes the first to-be-synchronized data of the first application to the second application in the second electronic device (the slave device).

The first application is installed on the first electronic device, and the second application is installed on the second electronic device. The first application and the second application may be a same application, for example, both the first application and the second application are Huawei MeeTime Call, or may be different applications, for example, the first application is Huawei MeeTime Call, and the second application is Huawei Video.

Step S302: The first electronic device determines a first channel identifier, where the first channel identifier is an identifier allocated by the second electronic device to the second application, the second electronic device includes the second application, and each first channel identifier corresponds to one second electronic device.

Specifically, after determining the first to-be-synchronized data that needs to be synchronized, the first electronic device may determine second electronic devices to which the first to-be-synchronized data needs to be synchronized, and obtain the first channel identifier of the second electronic device that requires data synchronization.

It should be noted that the first channel identifier may include a device identifier of the second electronic device and an application identifier of the second application. The device identifier is used to distinguish between devices, and the application identifier is used to distinguish between applications.

In specific application, a data synchronization management module 23 in the first electronic device may record channel identifiers of all slave devices and a connection channel corresponding to each channel identifier. For example, a first channel identifier A corresponds to a connection channel A, and a second channel identifier B corresponds to a connection channel B. The first channel identifier of the second electronic device that requires data synchronization may be determined from the data synchronization management module 23.

When the first application in the first electronic device needs to synchronize data, the first application may first invoke a synchronization initialization interface 222 of the first electronic device, to obtain a second channel identifier allocated by a bottom-layer near field transmission module 24 of the first electronic device to the first application. The second channel identifier includes a device identifier of the first electronic device and an application identifier of the first application. Then, the first electronic device broadcasts the second channel identifier to a surrounding second electronic device.

After receiving the second channel identifier broadcast by the first electronic device, the second electronic device may establish a connection channel with the first electronic device based on the second channel identifier. In addition, the second application in the second electronic device also invokes a synchronization initialization interface 222 of the second electronic device, to obtain a first channel identifier allocated by a bottom-layer near field transmission module 24 of the second electronic device to the second application. Then, the second electronic device transmits the first channel identifier to the first electronic device through the established connection channel. In addition, the second electronic device may also record the second channel identifier broadcast by the first electronic device and the connection channel corresponding to the second channel identifier.

After obtaining the first channel identifier transmitted by each second electronic device, the first electronic device records the first channel identifier corresponding to each second electronic device and the connection channel corresponding to each first channel identifier.

In the foregoing process, the first application in the first electronic device allocates the second channel identifier to the first application, and the second electronic device registers with the first electronic device.

Step S303: The first electronic device determines a connection channel corresponding to the first channel identifier, where the connection channel is a connection channel that has been established between the first electronic device and the second electronic device, and each first channel identifier corresponds to one connection channel.

Specifically, after determining the first channel identifier, the first electronic device may determine, based on a correspondence between a first channel identifier and a connection channel, the connection channel corresponding to the first channel identifier. The connection channel is a pre-established communication channel, and the connection channel may include but is not limited to Wi-Fi point-to-point, Wi-Fi STA, Bluetooth, and the like.

It may be understood that, if there are a plurality of second electronic devices, each second electronic device may be connected to the first electronic device through one connection channel. Types of connection channels between the first electronic device and the second electronic devices may be the same or different. For example, the first electronic device is a mobile phone, the second electronic device includes a tablet and a smart large screen, a connection channel between the mobile phone and the tablet is a Bluetooth channel, and a connection channel between the mobile phone and the smart large screen is a Wi-Fi point-to-point channel.

Step S304: The first electronic device transmits the first to-be-synchronized data to the second electronic device through the connection channel corresponding to the first channel identifier, to indicate the second electronic device to synchronize the first to-be-synchronized data to the second application.

In specific application, the first electronic device transmits the first to-be-synchronized data to the second electronic device through the determined connection channel. After receiving the first to-be-synchronized data, the near field transmission module 24 of the second electronic device may perform buffer management on the received first to-be-synchronized data by using a data receiving management unit 233 of the second electronic device, and provide the received first to-be-synchronized data for the second application in the second electronic device for reading, to synchronize the first to-be-synchronized data to the second application in the second electronic device.

It may be understood that, if there are a plurality of second electronic devices, each second electronic device may synchronize the first to-be-synchronized data to the second application in the second electronic device. It should be noted that second applications in the plurality of second electronic devices may be a same application or different applications.

It can be learned from the foregoing descriptions that, in this embodiment of this application, after the channel identifier is allocated to the application, cross-device application data synchronization in a near field environment is implemented based on the channel identifier. The electronic device does not need to access the Internet, and the electronic device does not need to log in to a platform account, an application account, or the like, and does not need to depend on a cloud server as a transit station for data exchange. In addition, the data synchronization solution in this embodiment of this application is not limited to synchronization between every two devices, but can also implement data synchronization between three or more electronic devices, and can further implement synchronization of dynamic local data generated in a process of using an application.

Before data synchronization, the first electronic device needs to initialize and allocate a channel identifier, and the second electronic device needs to register with the first electronic device.

Figure 4:
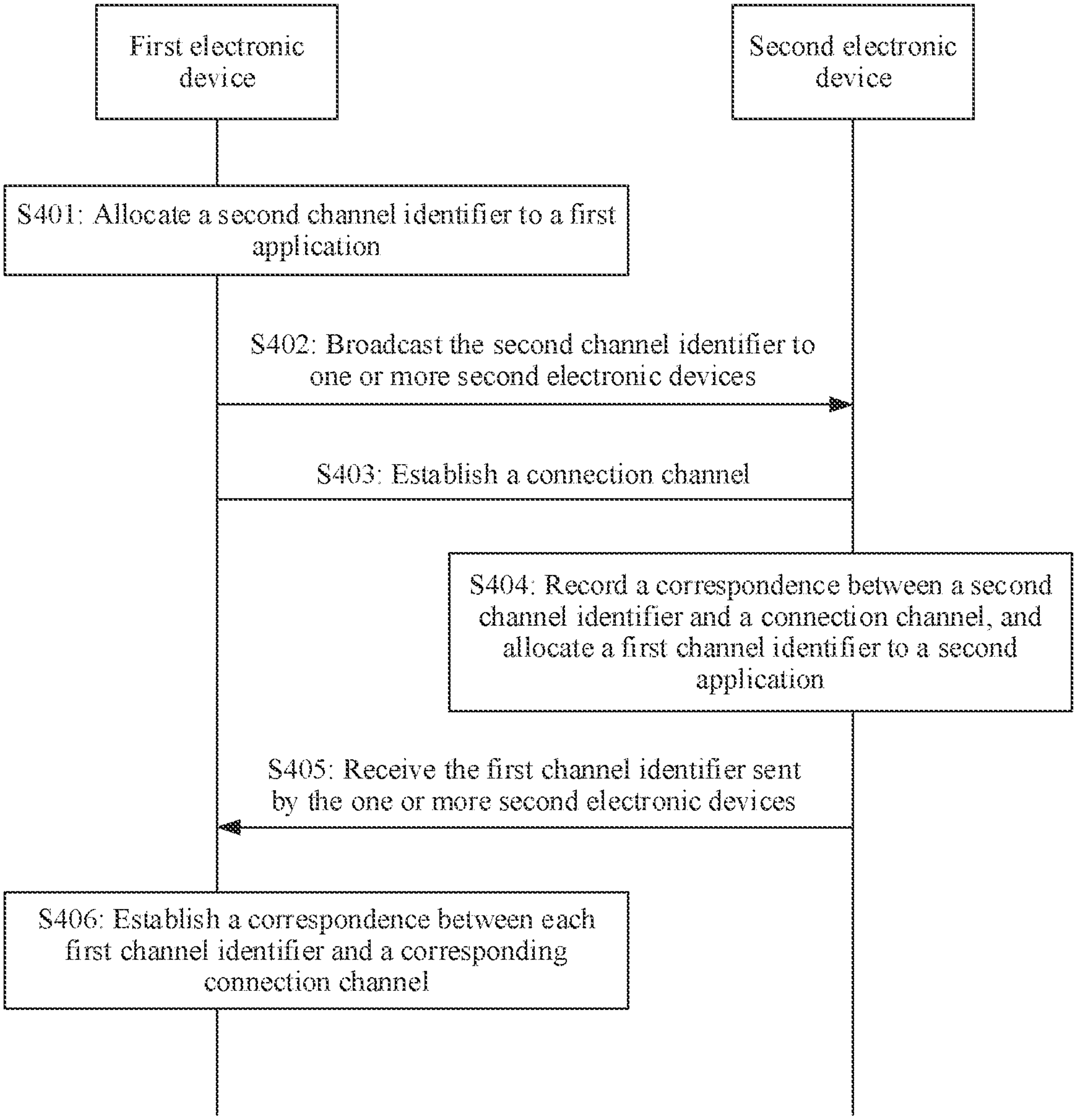
FIG. 4 is a schematic block diagram of a procedure of an initialization process according to an embodiment of this application.

In other words, in some embodiments, FIG. 4 is a schematic block diagram of a procedure of an initialization process according to an embodiment of this application. Before the obtaining to-be-synchronized data of a first application, the method corresponding to FIG. 3 may further include the following steps.

Step S401: The first electronic device allocates a second channel identifier to the first application.

In specific application, near field transmission modules of the first electronic device and the second electronic device may transmit a synchronization request of device information to another device, and respond to a synchronization request of the another device. If the first application in the first electronic device expects to synchronize data to the second application in the second electronic device, the first application invokes a synchronization initialization interface 222 of the first electronic device, and the synchronization initialization interface 222 invokes a data synchronization management module 23 to perform connection channel initialization processing. Then, the data synchronization management module 23 sends a bottom-layer channel initialization request to a bottom-layer near field transmission module 24, and the bottom-layer near field transmission module 24 of the first electronic device allocates the second channel identifier to the first application based on the device information and application information.

It should be noted that, before the first electronic device invokes a synchronization initialization interface to allocate the second channel identifier to the first application, the first electronic device may transmit an information synchronization request to another device, and the another device may respond to the synchronization request of the first electronic device and return a transmission information response message to the first electronic device.

Step S402: The first electronic device broadcasts the second channel identifier to one or more second electronic devices.

In specific application, after the bottom-layer near field transmission module 24 of the first electronic device allocates the second channel identifier to the first application based on the device information and the application information, the bottom-layer near field transmission module 24 of the first electronic device broadcasts the second channel identifier to a bottom-layer near field transmission module of the second electronic device, to broadcast the second channel identifier to the second electronic device.

Step S403: The second electronic device establishes a connection channel with the first electronic device.

Step S404: The second electronic device records a correspondence between a second channel identifier and a connection channel, and allocates a first channel identifier to a second application.

Step S405: The first electronic device receives the first channel identifier sent by the one or more second electronic devices.

Step S406: The first electronic device establishes a correspondence between each first channel identifier and a corresponding connection channel.

In specific application, after obtaining the second channel identifier broadcast by the first electronic device, the second electronic device may register with the first electronic device based on the second channel identifier. After the second electronic device completes initialization registration, the first electronic device records a first channel identifier of each second electronic device and a connection channel corresponding to each first channel identifier. In a subsequent process, when the first application in the first electronic device needs to perform data synchronization, the first application in the first electronic device may determine a connection channel based on the first channel identifier of the second electronic device, and synchronize the first to-be-synchronized data to the second application in the second electronic device through the connection channel.

Based on a sequence of invoking a synchronization initialization interface 222, the first electronic device is a master device, and the second electronic device is a slave device. To better describe a process in which the slave device registers with the master device, the following describes the process with reference to FIG. 5.

Figure 5:
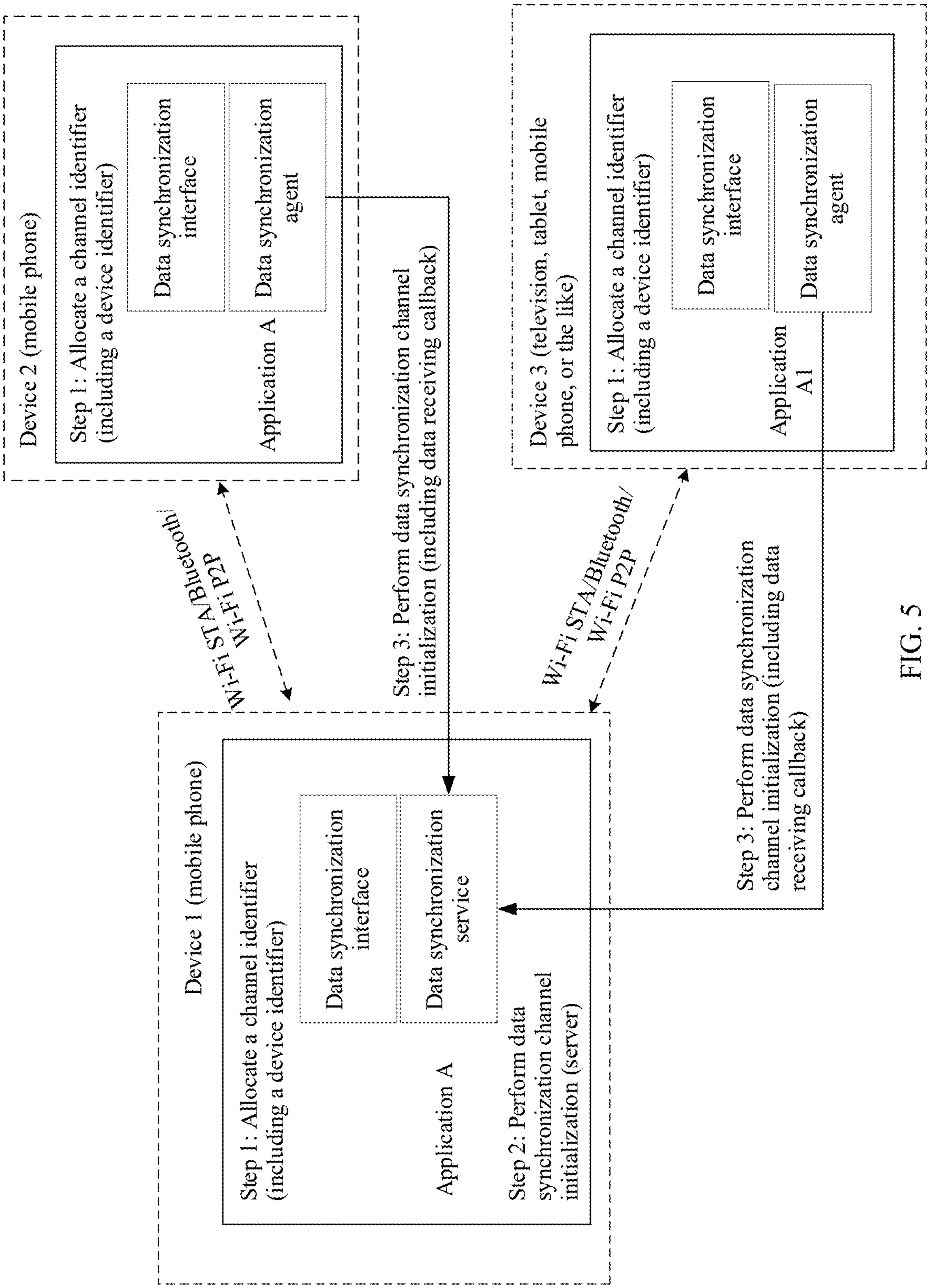
FIG. 5 is a schematic diagram of a process in which a slave device registers with a master device according to an embodiment of this application.

FIG. 5 is a schematic diagram of a process in which a slave device registers with a master device according to an embodiment of this application. As shown in FIG. 5, a device 1, a device 2, and a device 3 are included. The device 1 is a mobile phone, the device 2 is a mobile phone, and the device 3 is a television, a tablet, a mobile phone, or the like. The device 1 includes an application A, the device 2 includes an application A. and the device 3 includes an application A1.

The device 1 is a master device, and the application A in the device 1 may include a data synchronization interface and a data synchronization service. The data synchronization interface may be the data synchronization interface module 22 in FIG. 2, and the data synchronization service may include the data synchronization management module 23 and the bottom-layer near field transmission module 24 in FIG. 2. The applications in the device 2 and the device 3 each include a data synchronization interface and a data synchronization agent. The data synchronization agent may include the data synchronization management module 23 and the bottom-layer near field transmission module 24 in FIG. 2.

Based on FIG. 5, the process in which the slave device registers with the master device may include the following steps: Step 1: Each device allocates a channel identifier to an application in the device, where the channel identifier includes a device identifier and an application identifier. Step 2: The device 1 first invokes a synchronization initialization interface 222 of the device 1 to perform data synchronization channel initialization and complete registration of a server, where the device 1 serves as a master device during data synchronization. Step 3: As slave devices during data synchronization, the device 2 and the device 3 complete registration of a server by invoking a data synchronization channel initialization function, where the server may refer to the data synchronization service in the device 1.

In FIG. 5, a connection channel between the device 1 and the device 2 and a connection channel between the device 1 and the device 3 each may be Wi-Fi point-to-point, Wi-Fi STA, Bluetooth, or the like.

In FIG. 5, a connection channel is established between the master device and each slave device, and the master device records a channel identifier of each slave device and a correspondence between a channel identifier of each slave device and a connection channel.

After the slave device registers with the master device, data synchronization can be performed between the master device and the slave device based on the channel identifier. In a data synchronization process, the master device may synchronize data to the slave device, that is, the master device may synchronize data of an application in the master device to each slave device; and the slave device may also synchronize data to the master device, that is, the slave device may synchronize data of an application in the slave device to the master device.

A process in which the master device synchronizes data to the slave device may be the process corresponding to FIG. 3. To better describe the process, the following describes the process with reference to a schematic diagram of a process in which a master device synchronizes data to a slave device that is shown in FIG. 6.

Figure 6:
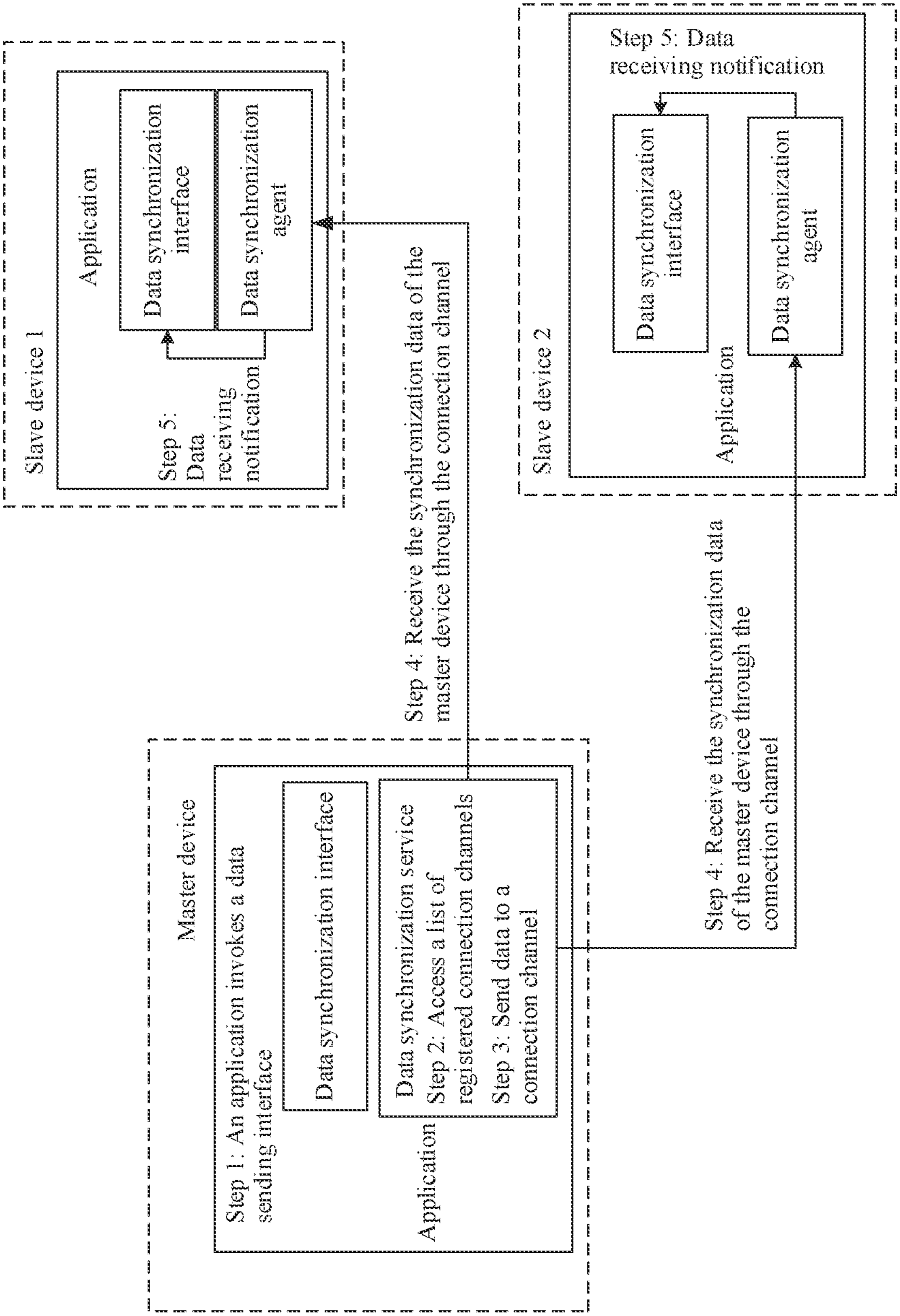
FIG. 6 is a schematic diagram of a process in which a master device synchronizes data to a slave device according to an embodiment of this application.

As shown in FIG. 6, a master device, a slave device 1, and a slave device 2 are included. The master device and the slave device each include an application. The master device includes a data synchronization interface and a data synchronization service. The slave device includes a data synchronization interface and a data synchronization agent.

Based on FIG. 6, the process in which the master device synchronizes the data to the slave device may include the following steps; Step 1: The master device invokes a data sending interface. Step 2: The data synchronization service in the master device accesses a list of registered connection channels to obtain connection channels corresponding to all to-be-synchronized channel identifiers. Step 3: The master device sends data to each slave device through a connection channel. Step 4: The slave device receives the synchronization data of the master device through the connection channel. Step 5: Each slave device invokes a data notification callback function provided in a data synchronization initialization interface to complete data synchronization and subsequent service processing.

After the process in which the master device synchronizes the data to the slave device is described, the following describes a process in which the slave device synchronizes data to the master device.

In some embodiments, the data synchronization method corresponding to FIG. 3 may further include: The first electronic device receives second to-be-synchronized data that is of the second application and that is sent by the second electronic device through a connection channel corresponding to the second channel identifier. The first electronic device synchronizes the second to-be-synchronized data to the first application.

In specific application, if the second electronic device needs to synchronize data of the second application in the second electronic device to the first application in the first electronic device, the second electronic device may invoke a data sending interface of the second electronic device to determine a second channel identifier of the first electronic device, and send the second to-be-synchronized data to the first electronic device through a connection channel corresponding to the second channel identifier. The first electronic device may invoke a data notification callback function to synchronize the second to-be-synchronized data to the first application in the first electronic device.

It may be understood that the second to-be-synchronized data is data that is of the second application and that needs to be synchronized. A data type of the second to-be-synchronized data may be random.

In addition to synchronizing the second to-be-synchronized data to the first electronic device, the second electronic device may further synchronize the second to-be-synchronized data to another second electronic device. To be specific, in some embodiments, the data synchronization method corresponding to FIG. 3 may further include: The first electronic device receives indication information sent by the second electronic device through the connection channel corresponding to the second channel identifier, where the indication information is used to indicate to transmit the second to-be-synchronized data to another second electronic device, and the another second electronic device is an electronic device other than the second electronic device that sends the second to-be-synchronized data in a plurality of second electronic devices.

It should be noted that the indication information may be carried in the second to-be-synchronized data, or may not be carried in the second to-be-synchronized data. The another second electronic device is a device other than the second electronic device that sends the second to-be-synchronized data. For example, the second electronic device includes a mobile phone, a tablet, and a smart television. The mobile phone needs to synchronize the second to-be-synchronized data to the first electronic device and the another second electronic device. In this case, the another second electronic device is the tablet or the smart television.

In this case, after receiving the second to-be-synchronized data, the first electronic device further needs to send the second to-be-synchronized data to the another second electronic device. A process in which the first electronic device sends the second to-be-synchronized data to the another second electronic device may include: determining a first channel identifier of the another second electronic device; determining a connection channel corresponding to the first channel identifier of the another second electronic device, and transmitting the second to-be-synchronized data to the another second electronic device through the connection channel corresponding to the first channel identifier of the another second electronic device, to indicate the another second electronic device to synchronize the second to-be-synchronized data to a second application in the another second electronic device.

It may be understood that the first electronic device may determine, based on information about the another second electronic device that is carried in the indication information, the another second electronic device that requires data synchronization. Then, the first electronic device determines the first channel identifier of the another second electronic device based on a locally recorded first channel identifier of each second electronic device, and determines the connection channel based on the channel identifier. Finally, the first electronic device sends the second to-be-synchronized data to the another second electronic device through the connection channel corresponding to the another second electronic device.

Figure 7:
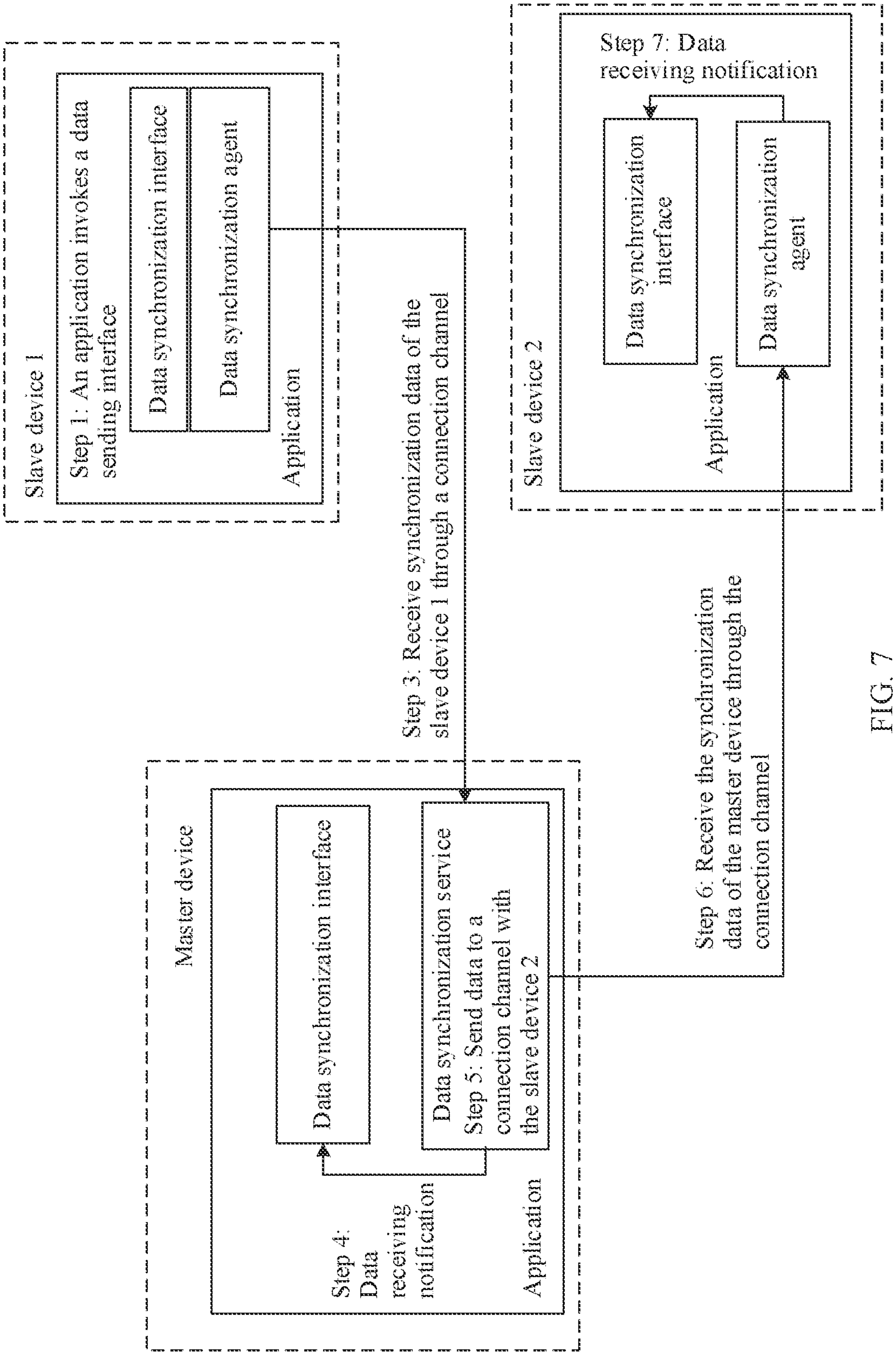
FIG. 7 is a schematic diagram in which a slave device synchronizes data to a master device and another slave device according to an embodiment of this application.

To better describe the process in which the slave device synchronizes the data to the master device and the another slave device, the following describes the process with reference to a schematic diagram in which a slave device synchronizes data to a master device and another slave device according to an embodiment of this application that is shown in FIG. 7.

As shown in FIG. 7, a master device, a slave device 1, and a slave device 2 are included. The master device and the slave device each include an application. The master device includes a data synchronization interface and a data synchronization service, and the slave device includes a data synchronization interface and a data synchronization agent.

Based on FIG. 7, the process may include the following steps: Step 1: The slave device 2 invokes a data sending interface. Step 2: The data synchronization agent in the slave device 2 sends data to a connection channel with the master device. Step 3: The master device receives synchronization data of the slave device 2. Step 4: The master device invokes a data notification callback function by using the data synchronization service to complete data synchronization and subsequent service processing. Perform steps 5 to 7 if the slave device 2 needs to synchronize the data to another slave device; or end a current synchronization procedure if the slave device 2 does not need to synchronize the data to another slave device. Step 5: The master device sends the synchronization data to a connection channel with a slave device 3. Step 6: The slave device 2 receives the synchronization data of the master device through the connection channel. Step 7: The slave device 3 invokes the data notification callback function in the data synchronization service to complete data synchronization and subsequent service processing.

In some embodiments, each electronic device may be further configured to manage sending or receiving of each type of data by using a data synchronization option. The data synchronization option includes a data sending option and a data receiving option, and each data type has a data sending option and a data receiving option of the data type. A data sending option and a data receiving option of a same data type are independent of each other. Data receiving and sending are controlled by turning off and turning on the data sending option or the data receiving option.

Usually, a data sending option and a data receiving option corresponding to each data type are in an on state by default. If data of a specific type needs not to be received, or data of a specific data type needs not to be sent, a data sending option or a data receiving option corresponding to the data type may be turned off. An application in each device may accurately control sending or receiving of each type of data by using a data synchronization option.

First, the data synchronization option may be set, to set the data synchronization option to a corresponding state based on a sending or receiving requirement. In specific application, the first electronic device may first obtain a setting instruction of a first synchronization option, where the first synchronization option includes a first receiving option and a first sending option. Then, the second electronic device sets the first synchronization option based on a data type, a synchronization action, and an option setting value in the setting instruction, where the synchronization action includes data sending and data receiving.

Specifically, the application in the first electronic device may invoke a synchronization development setting interface to set the data type, the synchronization action, and the option setting value. Then, the first electronic device determines, through comparison, whether a synchronization action option and a development setting value of each data type are the same as a value in a current state. If the synchronization action option and the development setting value of each data type are different from the value in the current state, the first electronic device updates a value of a corresponding action option of a corresponding data type to the specified option setting value.

It should be noted that the data type may include but is not limited to a message, an object, a large byte, a file, and a stream. The synchronization action may include data sending and data receiving. The development setting value may include True and False. When a development setting value of a synchronization option of a specific type of data is True, it indicates that the synchronization option is in an on state. On the contrary, when a development setting value of a synchronization option of a specific type of data is False, it indicates that the synchronization option is in an off state.

A status of a synchronization option of each type of data may be set by using the setting instruction. For example, message type data corresponds to a data sending option and a data receiving option. If a development setting value of the data sending option of the message type data is True, it indicates that the data sending option of the message type data is in an on state, and the device may send the message type data. On the contrary, if a development setting value of the data sending option of the message type data is False, it indicates that the data sending option of the message type data is in an off state, and the device cannot send the message type data.

It should be noted that sending and receiving of each type of data are controlled by setting the data synchronization option, so that convenience of a data synchronization operation performed by an application can be improved.

Based on this, before sending the first to-be-synchronized data, the first electronic device may first determine whether to allow sending of the first to-be-synchronized data; and if sending of the first to-be-synchronized data is allowed, enter a procedure of sending the first to-be-synchronized data, that is, may enter a step of determining the first channel identifier; or if sending of the first to-be-synchronized data is not allowed, may not send the first to-be-synchronized data.

The first electronic device may determine, based on a status of a data sending option corresponding to a data type of the first to-be-synchronized data, whether to allow sending of the first to-be-synchronized data. Specifically, the first electronic device determines a second target data type of the first to-be-synchronized data. Then, the first electronic device determines whether a first sending option corresponding to the second target data type is in an on state; and if the first sending option is in the on state, determines to allow sending of the first to-be-synchronized data; or if the first sending option is in an off state, determines not to allow sending of the first to-be-synchronized data, where each data type corresponds to one data sending option.

For example, the first electronic device determines that the first to-be-synchronized data is file type data, and then determines whether an option setting value of a data sending option of the file type data is True. If the option setting value of the data sending option of the file type data is True, the first electronic device determines that the sending option (that is, the first sending option) of the file type data is in an on state, and allows sending of the file type data. On the contrary, if the option setting value of the data sending option of the file type data is False, the first electronic device determines that the sending option of the file type data is in an off state, and does not allow sending of the file type data.

It should be noted that, when sending data, the first electronic device may query a data sending option, to determine whether the type of data can be sent. In specific application, the first electronic device may query a data sending option when invoking a data sending interface. In addition, if the data sending option is in an off state, the first electronic device may record corresponding log information.

The first electronic device queries a data sending option when sending data, and may also query a data receiving option w % ben receiving data, to determine whether data of a corresponding type can be received.

To be specific, before the first electronic device receives the second to-be-synchronized data of the second electronic device, the first electronic device may further determine whether to allow receiving of the second to-be-synchronized data; and if receiving of the second to-be-synchronized data is allowed, enter the step of receiving the second to-be-synchronized data that is of the second application and that is sent by the second electronic device through the connection channel corresponding to the second channel identifier; or if receiving of the second to-be-synchronized data is not allowed, may record corresponding log information.

In specific application, the first electronic device may first determine a first target data type of the second to-be-synchronized data. Then, the first electronic device determines whether a first receiving option corresponding to the first target data type is in an on state; and if the first receiving option is in the on state, determines to allow receiving of the second to-be-synchronized data; or if the first receiving option is in an off state, determines not to allow receiving of the second to-be-synchronized data, to determine whether to allow receiving of the second to-be-synchronized data, where each data type corresponds to one receiving option.

For example, a data type of the second to-be-synchronized data is a stream. When receiving the second to-be-synchronized data, the first electronic device queries a status of a data receiving option corresponding to the data stream. If an option setting value of the data receiving option corresponding to the stream type data is True, it indicates that the data receiving option is in an on state, and the stream type data is allowed to be received. On the contrary, if an option setting value of the data receiving option corresponding to the stream type data is False, it indicates that the data receiving option is in an off state, and the stream type data is not allowed to be received.

The foregoing embodiment corresponding to FIG. 3 mainly shows a related procedure on a side of the first electronic device. The following describes a related procedure on a side of the second electronic device corresponding to FIG. 3.

Corresponding to the procedure of the first electronic device shown in FIG. 3, the related procedure on the side of the second electronic device may include: receiving, through a connection channel corresponding to a second channel identifier, first to-be-synchronized data sent by a first electronic device, where the second channel identifier is an identifier allocated by the first electronic device to a first application, the first electronic device includes the first application, and the first to-be-synchronized data is data of the first application; and synchronizing the first to-be-synchronized data to a second application, where the second electronic device includes the second application.

It should be noted that, the second channel identifier of the first electronic device and the connection channel corresponding to the second channel identifier are recorded on the side of the second electronic device.

Corresponding to the procedure of the first electronic device shown in FIG. 4, the related procedure on the side of the second electronic device may include: receiving the second channel identifier broadcast by the first electronic device, where each second channel identifier corresponds to one first electronic device; establishing a connection channel with the first electronic device based on the second channel identifier; allocating a first channel identifier to the second application; and transmitting the first channel identifier to the first electronic device through the connection channel established based on the second channel identifier.

Specifically, a near field transmission module of the second electronic device may transmit a synchronization request of device information to another device, and respond to a synchronization request of the another device. The second electronic device may invoke a synchronization initialization interface 222 of the second electronic device, and the synchronization initialization interface 222 invokes a data synchronization management module 23 to perform connection channel initialization processing. Then, the data synchronization management module 23 sends a bottom-layer channel initialization request to a bottom-layer near field transmission module 24, and the bottom-layer near field transmission module 24 of the second electronic device allocates the first channel identifier to the second application in the second electronic device based on the device information and application information.

The second electronic device may receive the first to-be-synchronized data synchronized by the first electronic device, or may synchronize the second to-be-synchronized data to the first electronic device. In specific application, the second electronic device may first obtain the second to-be-synchronized data of the second application, and then transmit the second to-be-synchronized data to the first electronic device through the connection channel corresponding to the second channel identifier, to indicate the first electronic device to synchronize the second to-be-synchronized data to the first application.

It may be understood that, if the second electronic device expects to synchronize the second to-be-synchronized data to another second electronic device, when sending the second to-be-synchronized data to the first electronic device, the second electronic device may send indication information to indicate the first electronic device to transmit the second to-be-synchronized data to the another second electronic device, where the indication information carries related information of the another second electronic device.

A data synchronization option is also disposed on the second electronic device, to manage sending or receiving of each type of data.

Specifically, before receiving the first to-be-synchronized data sent by the first electronic device, the second electronic device may first determine whether to allow receiving of the first to-be-synchronized data; and if receiving of the first to-be-synchronized data is allowed, enter the step of receiving, through the connection channel corresponding to the second channel identifier, the first to-be-synchronized data sent by the first electronic device; or if receiving of the first to-be-synchronized data is not allowed, record corresponding log information.

In specific application, the second electronic device may first determine a third target data type of the first to-be-synchronized data; then determine whether a second receiving option corresponding to the third target data type is in an on state; and if the second receiving option is in the on state, determine to allow receiving of the first to-be-synchronized data; or if the second receiving option is in an off state, determine not to allow receiving of the first to-be-synchronized data, where each data type corresponds to one receiving option.

Similarly, when sending the second to-be-synchronized data, the second electronic device may also query a corresponding data sending option to determine whether to allow sending of the type of data. To be specific, before sending the second to-be-synchronized data, the second electronic device may first determine whether to allow sending of the second to-be-synchronized data; and if sending of the second to-be-synchronized data is allowed, enter the step of transmitting the second to-be-synchronized data to the first electronic device through the connection channel corresponding to the second channel identifier; or if sending of the second to-be-synchronized data is not allowed, record corresponding log information.

In specific application, the second electronic device may first determine a fourth target data type of the second to-be-synchronized data; then determine whether a second sending option of the fourth target data type is in an on state; and if the second sending option is in the on state, determine to allow sending of the second to-be-synchronized data; or if the second sending option is in an off state, determine not to allow sending of the second to-be-synchronized data, where each data type corresponds to one sending option.

It may be understood that a data sending option and a data receiving option on the second electronic device may also be set by setting quality. Specifically, the second electronic device may first obtain a setting instruction of a second synchronization option, where the second synchronization option includes a second receiving option and a second sending option; and then set the second synchronization option based on a data type, a synchronization action, and an option setting value in the setting instruction, where the synchronization action includes data sending and data receiving.

It should be noted that, for detailed descriptions of related content of the data synchronization option of the second electronic device and a type of the data synchronization option of the first electronic device, refer to the foregoing descriptions of the data synchronization option of the first electronic device. Details are not described herein again.

Figure 8A:
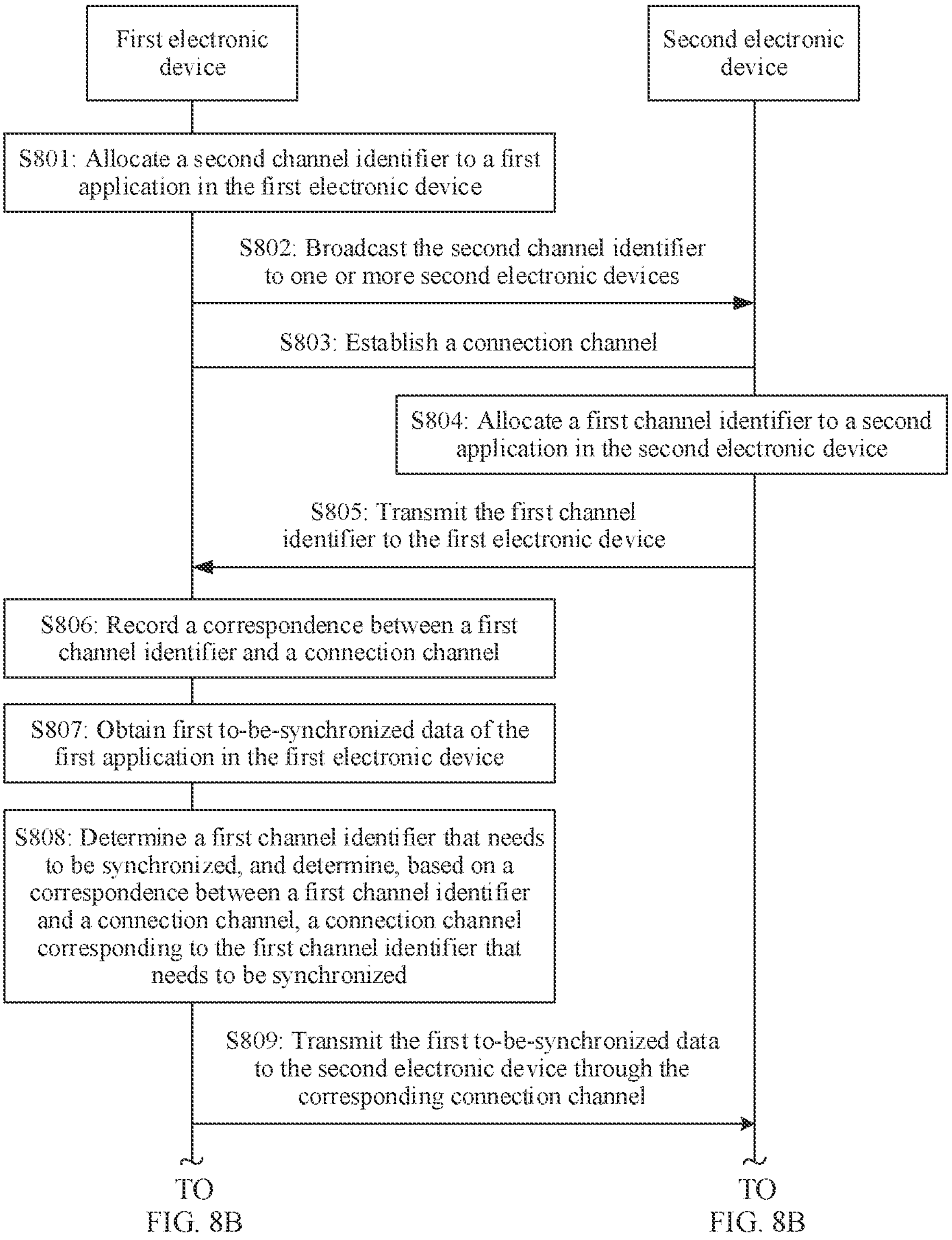
FIG. 8A and FIG. 8B are a schematic diagram of a data synchronization and exchange process according to an embodiment of this application.
Figure 8B:
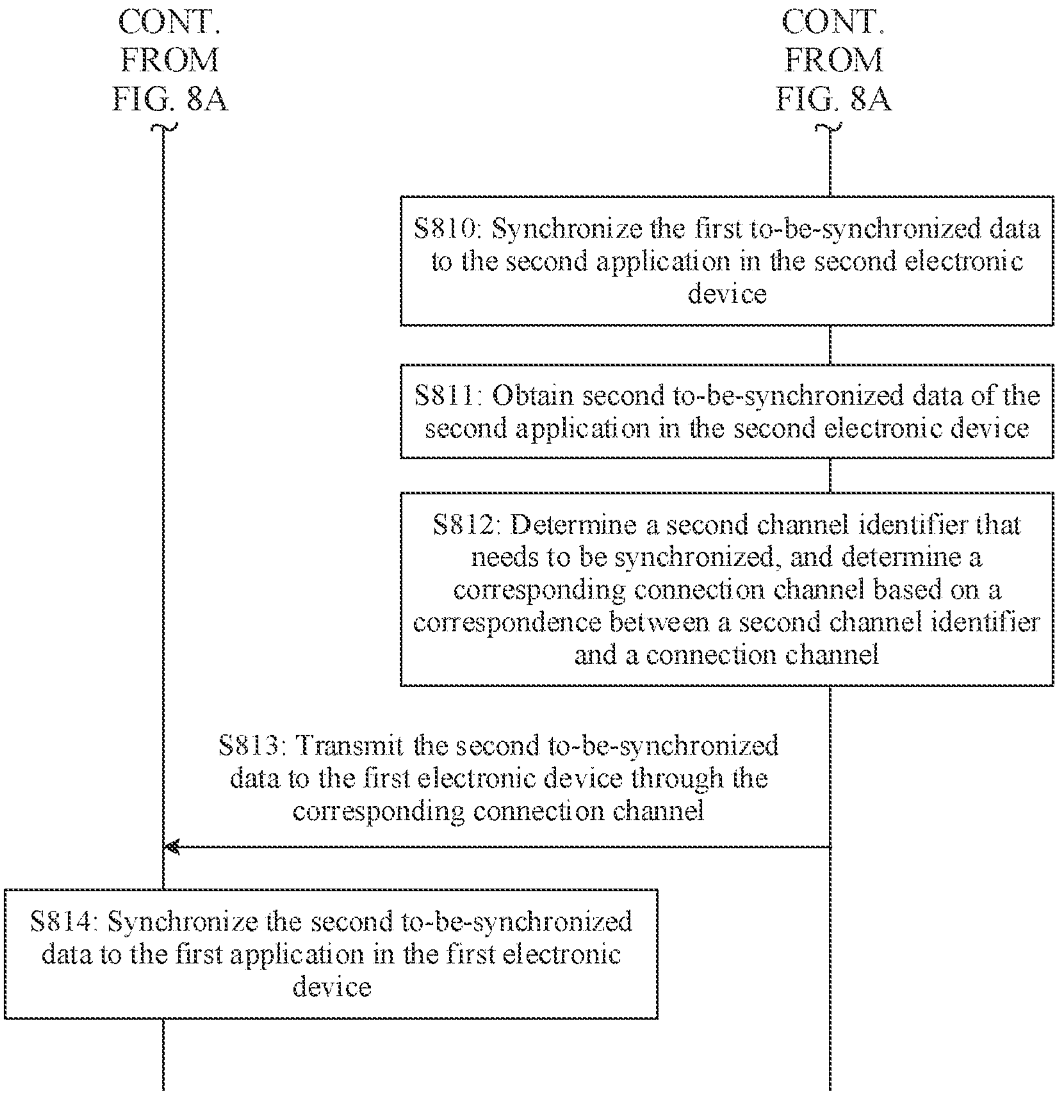

After related procedures on the side of the first electronic device and the side of the second electronic device are described, the following describes an interaction process between the first electronic device and the second electronic device with reference to FIG. 8A and FIG. 8B.

FIG. 8A and FIG. 8B are a schematic diagram of a data synchronization and exchange process according to an embodiment of this application. The process may include the following steps:

Step S801: A first electronic device allocates a second channel identifier to a first application in the first electronic device.

Step S802: The first electronic device broadcasts the second channel identifier to one or more second electronic devices.

Step S803: The second electronic device establishes a connection channel with the first electronic device based on the second channel identifier.

Step S804: The second electronic device allocates a first channel identifier to a second application in the second electronic device.

Step S805: The second electronic device transmits the first channel identifier to the first electronic device through the established connection channel.

Step S806: The first electronic device records a correspondence between a first channel identifier and a connection channel.

Step S807: The first electronic device obtains first to-be-synchronized data of the first application in the first electronic device.

Step S808: The first electronic device determines a first channel identifier that needs to be synchronized, and determines, based on a correspondence between a first channel identifier and a connection channel, a connection channel corresponding to the first channel identifier that needs to be synchronized.

Step S809: The first electronic device transmits the first to-be-synchronized data to the second electronic device through the corresponding connection channel.

Step S810: The second electronic device synchronizes the first to-be-synchronized data to the second application in the second electronic device.

Step S811: The second electronic device obtains second to-be-synchronized data of the second application in the second electronic device.

Step S812: The second electronic device determines a second channel identifier that needs to be synchronized, and determines a corresponding connection channel based on a correspondence between a second channel identifier and a connection channel.

Step S813: The second electronic device transmits the second to-be-synchronized data to the first electronic device through the corresponding connection channel.

Step S814: The first electronic device synchronizes the second to-be-synchronized data to the first application in the first electronic device.

It should be noted that FIG. 8A and FIG. 8B show the data exchange process between the master device and the slave device in a data synchronization process. Steps S801 to S806 are processes in which the master device initializes and allocates a channel identifier and the slave device registers with the master device. Steps S807 to S811 are a process in which the master device synchronizes data to the slave device. Steps S812 to S815 are a process in which the slave device synchronizes data to the master device.

It should be further noted that, after the processes of initializing and allocating the channel identifier and registering the slave device with the master device are completed, the master device may first synchronize data to the slave device, and then the slave device synchronizes data to the master device. Certainly, in some other embodiments, the slave device may first synchronize data to the master device or another slave device, and then the master device synchronizes data to the slave device.

In other words, after the processes of initializing and allocating the channel identifier and registering the slave device with the master device are completed, a sequence of the process in which the master device synchronizes the data to the slave device and the process in which the slave device synchronizes the data to the master device may be random. Certainly, the two processes may also be simultaneously performed.

In some other embodiments, the procedure in FIG. 8A and FIG. 8B may further include a process in which the first electronic device queries a data synchronization option and a process in which the second electronic device queries a synchronization option, and may also include a process in which the second electronic device synchronizes data to another electronic device.

It should be noted that for same or similar parts between FIG. 8A and FIG. 8B and the foregoing embodiments, refer to the foregoing corresponding content. Details are not described herein again.

In some embodiments, after the processes of initializing and allocating the channel identifier and registering the slave device with the master device and the like are completed, in the data synchronization process, the master device first synchronizes data to the slave device, and then the slave device synchronizes data to the master device. Certainly, the slave device may also first synchronize data to the master device, and then the master device synchronizes data to the slave device. That is, the second electronic device first synchronizes the data to the first electronic device, and then the first electronic device synchronizes the data to the second electronic device.

To be specific, an embodiment of this application may further provide a data synchronization method, applied to a second electronic device. The method includes: obtaining third to-be-synchronized data of a second application, where the second electronic device includes the second application; determining a second channel identifier, where the second channel identifier is an identifier allocated by a first electronic device to a first application, the first electronic device includes the first application, and each second channel identifier corresponds to one first electronic device; determining a connection channel corresponding to the second channel identifier, where the connection channel is a connection channel that has been established between the first electronic device and the second electronic device, and each second channel identifier corresponds to one connection channel; and transmitting the third to-be-synchronized data to the first electronic device through the connection channel corresponding to the second channel identifier, to indicate the first electronic device to synchronize the third to-be-synchronized data to the first application.

It should be noted that the third to-be-synchronized data is data that needs to be synchronized by the second application in the second electronic device to the first application in the first electronic device.

Correspondingly, on a side of the first electronic device, the method may include: receiving, through a connection channel corresponding to a first channel identifier, third to-be-synchronized data sent by a second electronic device, where the first channel identifier is an identifier allocated by the second electronic device to a second application, the second electronic device includes the second application, and the third to-be-synchronized data is data of the second application; and synchronizing the third to-be-synchronized data to a first application, where the first electronic device includes the first application.

It should be noted that, in this embodiment, processes of initializing and allocating a channel identifier, registering a slave device with a master device, and querying a data synchronization and the like may be further included. These processes may be similar to those in the foregoing embodiments. For detailed descriptions, refer to the foregoing descriptions. Details are not described herein again.

The data synchronization method provided in embodiments of this application may be applied to various scenarios, for example, a multi-device collaboration scenario. By way of example but not limitation, the following describes two possible application scenarios by using examples.

Figure 9A:
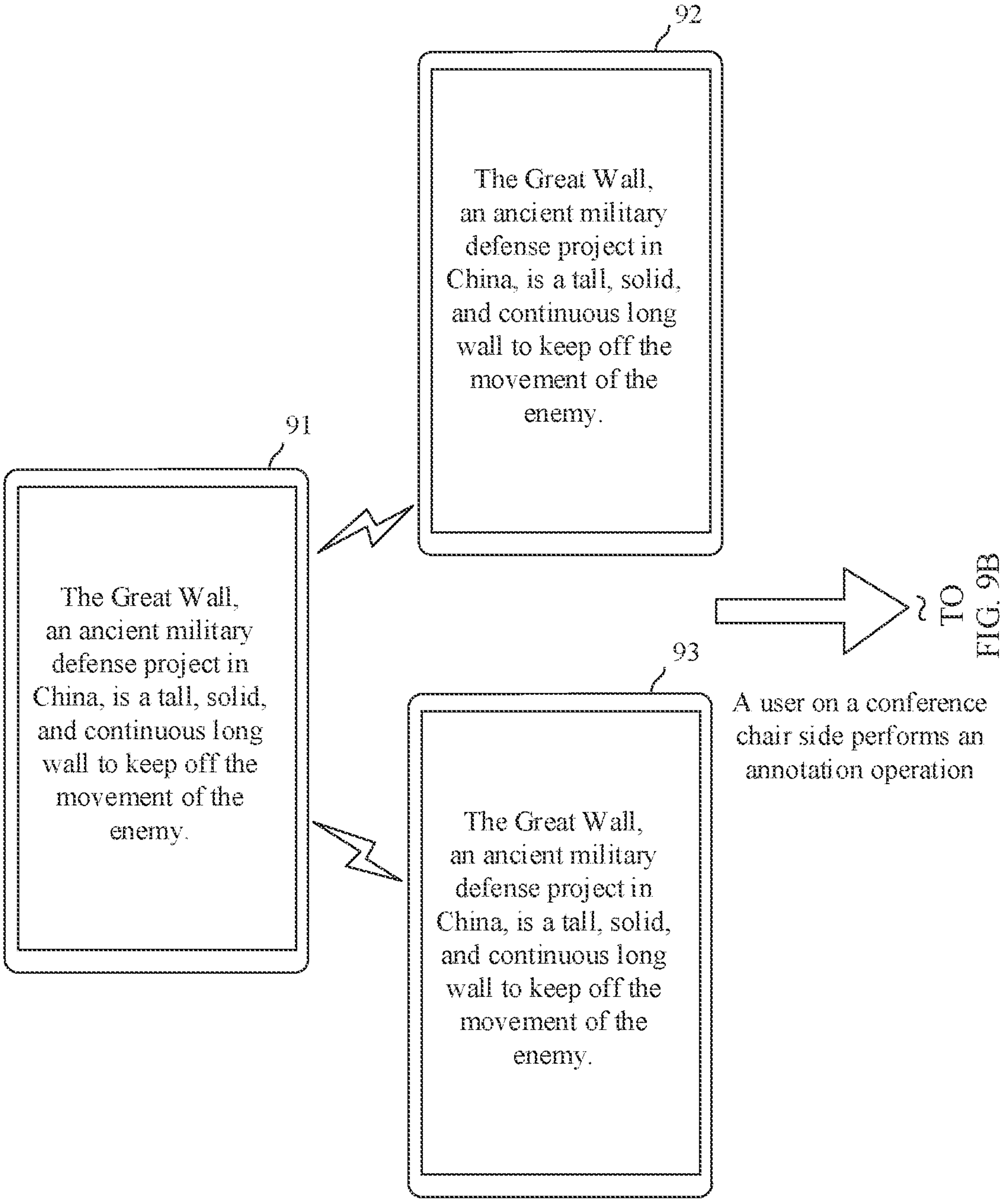
FIG. 9A and FIG. 9B are a schematic diagram of a scenario in which a document conference is performed on a plurality of devices according to an embodiment of this application.
Figure 9B:
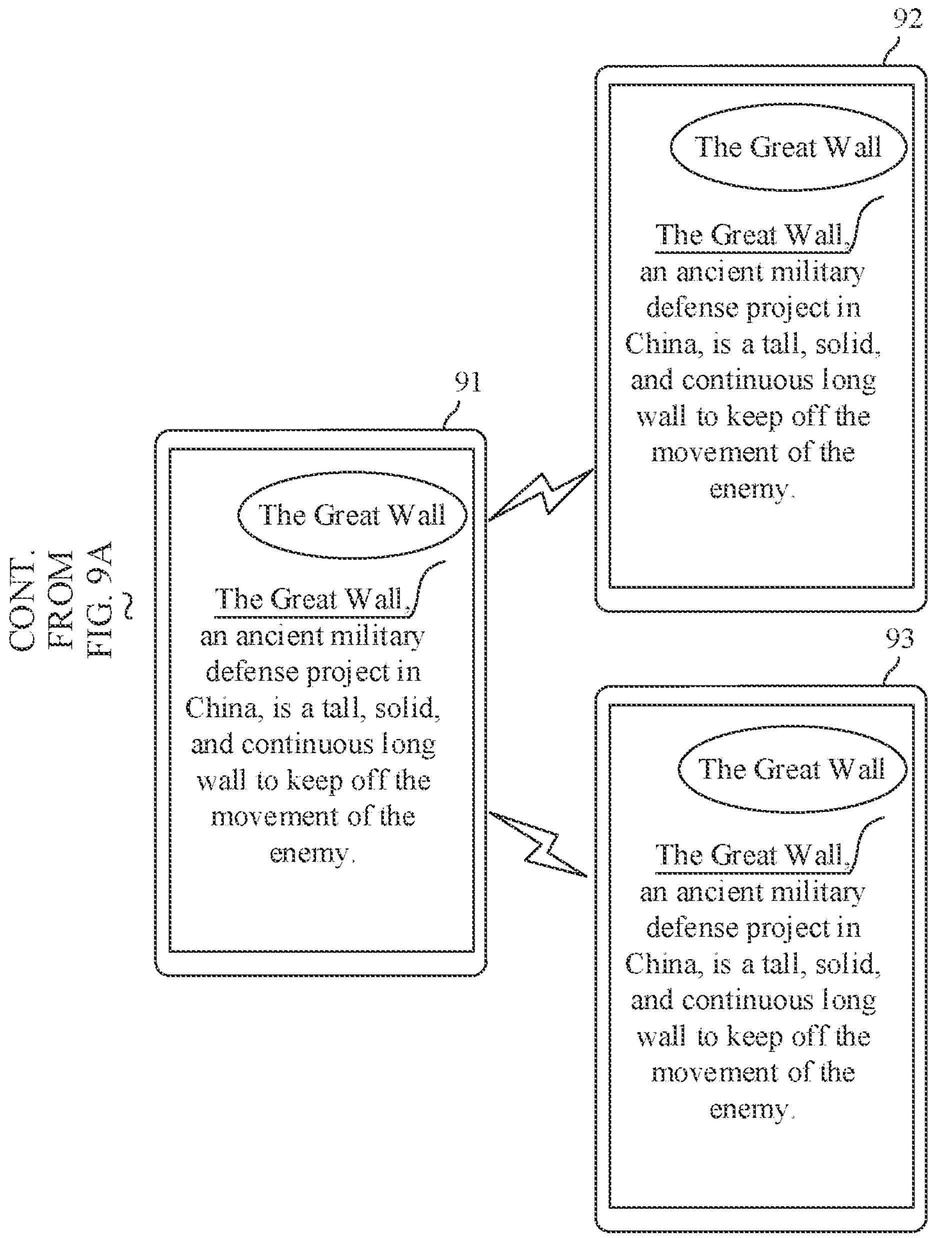

Scenario in which a document conference is performed on a plurality of devices: FIG. 9A and FIG. 9B are a schematic diagram of a scenario in which a document conference is performed on a plurality of devices according to an embodiment of this application. As shown in FIG. 9A and FIG. 9B, the scenario may include a mobile phone 91, a mobile phone 92, and a mobile phone 93. The mobile phone 91 is used as a master device in a data synchronization process, and the mobile phone 92 and the mobile phone 93 are used as slave devices in the data synchronization process. A document application is installed on each of the mobile phone 91, the mobile phone 92, and the mobile phone 93.

In a document conference process, the mobile phone 91, the mobile phone 92, and the mobile phone 93 all run the document application. The mobile phone 91 is used as a conference chair device, and the mobile phone 92 and the mobile phone 93 are used as participant devices. A user on a conference chair side can browse a document, turn pages of the document, and scale up the document, may also annotate, modify, and mark the document, and the like. Data on the mobile phone 91 is synchronized to the mobile phone 92 and the mobile phone 93 in real time, so that document display effects of the mobile phone 91, the mobile phone 92, and the mobile phone 93 are synchronized. Specifically, after the user performs an operation, the mobile phone 91 immediately displays an interface obtained after the operation. In addition, the mobile phone 91 also synchronizes the document and operation data to the mobile phone 92 and the mobile phone 93. After receiving the operation data and the document, the mobile phone 92 and the mobile phone 93 synchronize corresponding data to document applications that are running on the mobile phone 92 and the mobile phone 93, and display a rendered document, to implement document display synchronization of the mobile phone 91, the mobile phone 92, and the mobile phone 93.

Figure 10:
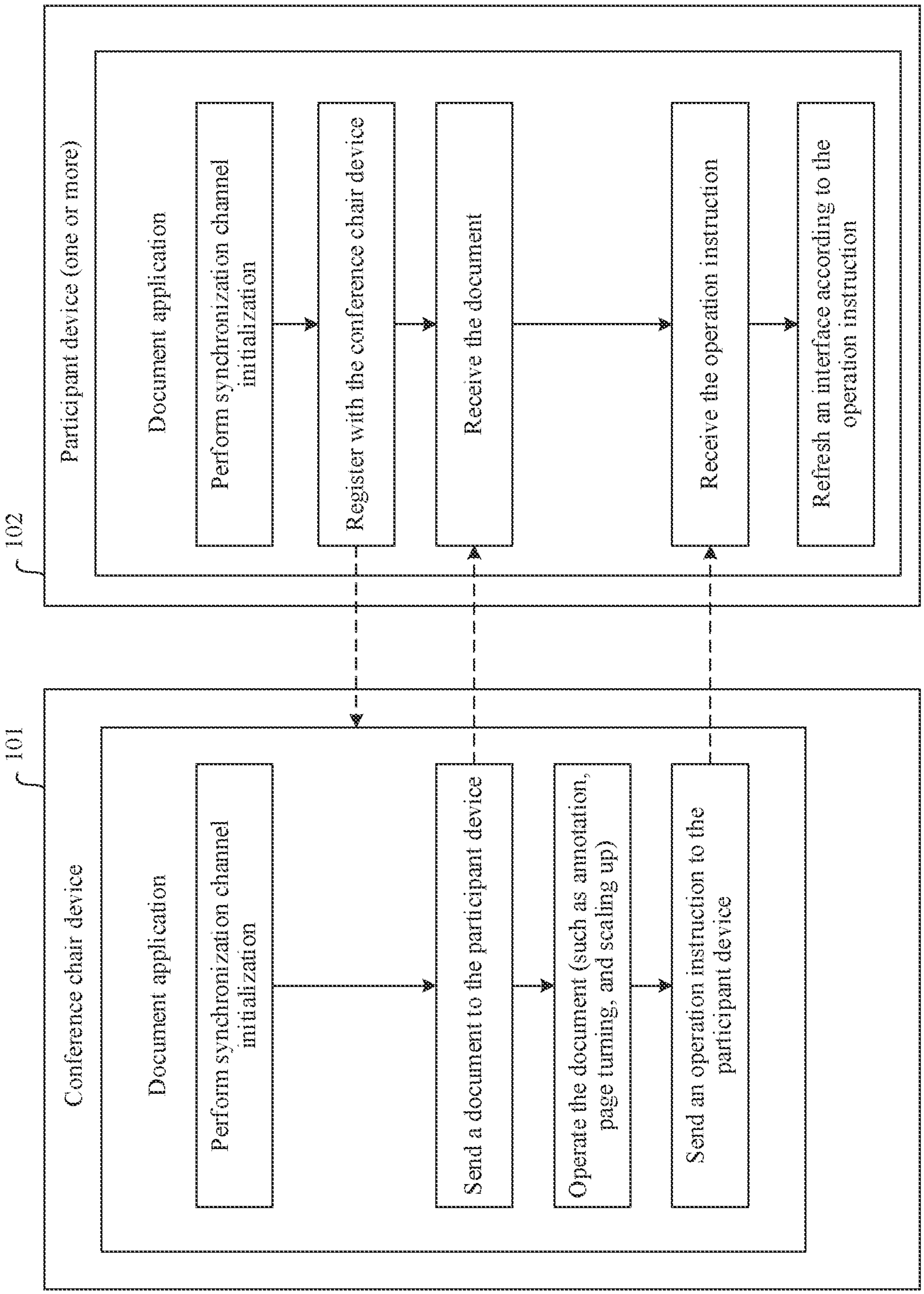
FIG. 10 is a schematic diagram of a multi-device document conference interaction process according to an embodiment of this application.

FIG. 10 is a schematic diagram of a multi-device document conference interaction process according to an embodiment of this application. As shown in FIG. 10, a conference chair device 101 and a participant device 102 each include a document application. The conference chair device 101 may be a mobile phone 91, and there may be one or more participant devices 102, which may include a mobile phone 92 and a mobile phone 93.

The conference chair device 101 first performs synchronization channel initialization, to allocate a second channel identifier to a document application in the conference chair device 101. Then, the conference chair device 101 broadcasts the second channel identifier to the participant device 102. The participant device 102 may establish a near field connection channel with the conference chair device based on the second channel identifier. In addition, the participant device 102 also performs synchronization channel initialization, to allocate a first channel identifier to a document application in the participant device 102. After obtaining the first channel identifier of the document application, the participant device 102 may transmit the first channel identifier to the conference chair device 101 through the established connection channel, to register with the master device.

Then, the conference chair device 101 may send a document to the participant device 102. Specifically, the conference chair device 101 first determines a first channel identifier of the participant device 102, and then sends the document to the participant device 102 through a connection channel corresponding to the first channel identifier, where the document is data that needs to be synchronized by the conference chair device 101 to the participant device 102.

After the participant device 102 receives the document synchronized by the conference chair device 101, the document application in the participant device 102 reads the document, and renders and displays the document. In this case, document interfaces displayed by the conference chair device 101 and the participant device 102 are the same.

A user of the conference chair device 101 may operate the document, for example, annotate the document, turn pages of the document, or scale up the document. The document application in the conference chair device 101 may obtain an operation instruction, and send the operation instruction to each participant device 102 based on the first channel identifier of the participant device 102. After the participant device 102 receives the operation instruction data sent by the conference chair device 102, the document application in the participant device 102 reads the operation instruction, and refreshes an interface of the document application in the participant device 102 according to the operation instruction. For example, if the document application in the conference chair device 101 turns pages, the participant device 102 performs a page turning operation according to a page turning instruction.

It can be learned from the foregoing descriptions that, according to the data synchronization solution provided in this embodiment of this application, an effect of synchronously displaying the document by the conference chair device 101 and the participant device 102 is implemented without depending on a cloud server and an account login mechanism. In addition, according to the data synchronization solution provided in this embodiment of this application, synchronization of dynamic data of an application document in a near field environment can be further implemented, so that document interfaces on the participant device and the conference chair device are synchronously displayed.

It should be noted that, in the multi-device document conference scenario, in addition to synchronizing the operation instruction, the master device may also synchronize refreshed page data to the slave device. In addition, a user of the slave device may also perform operations such as annotation and page turning on the document, and then synchronize the data, so that an effect of synchronizing document display interfaces on the slave device and the master device can also be implemented. That is, the application in the master device may synchronize data to the application in the slave device, and the application in the slave device may also synchronize data to the application in the master device.

Figure 11:
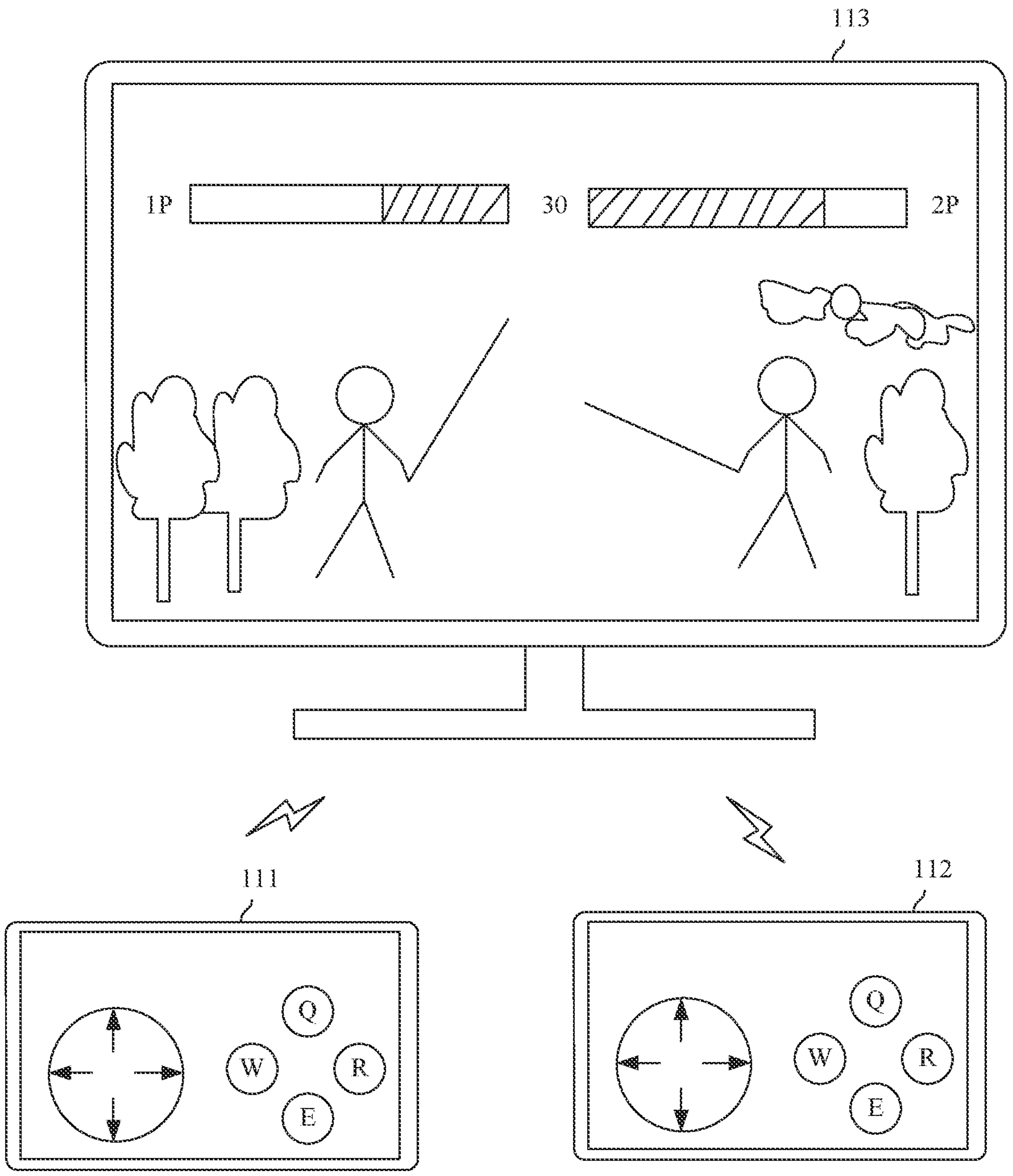
FIG. 11 is a schematic diagram of an architecture of a system of a multiplayer game on a plurality of devices according to an embodiment of this application.

Multi-device-based multiplayer game scenario: FIG. 11 is a schematic diagram of a system architecture of a multiplayer game on a plurality of devices according to an embodiment of this application. As shown in FIG. 11, the system architecture includes a mobile phone 111, a mobile phone 112, and a large-screen device 113. The large-screen device 113 may be a device with a large display area, such as a television or a tablet. The large-screen device 113 may be used as a master device in a data synchronization process, and the mobile phone 111 and the mobile phone 112 are used as slave devices in the data synchronization process. A game service application runs on the large-screen device 113, and a game control application runs on each of the mobile phone 111 and the mobile phone 112. The game service application may collaborate with the game control application to determine when to join a game. The game control application may synchronize a control action (for example, moving up, down, left, and right) of a user to a game server. The game service application may complete an operation of a character in the game according to a received control instruction. In this way, an effect of multiplayer game interaction is implemented.

Figure 12:
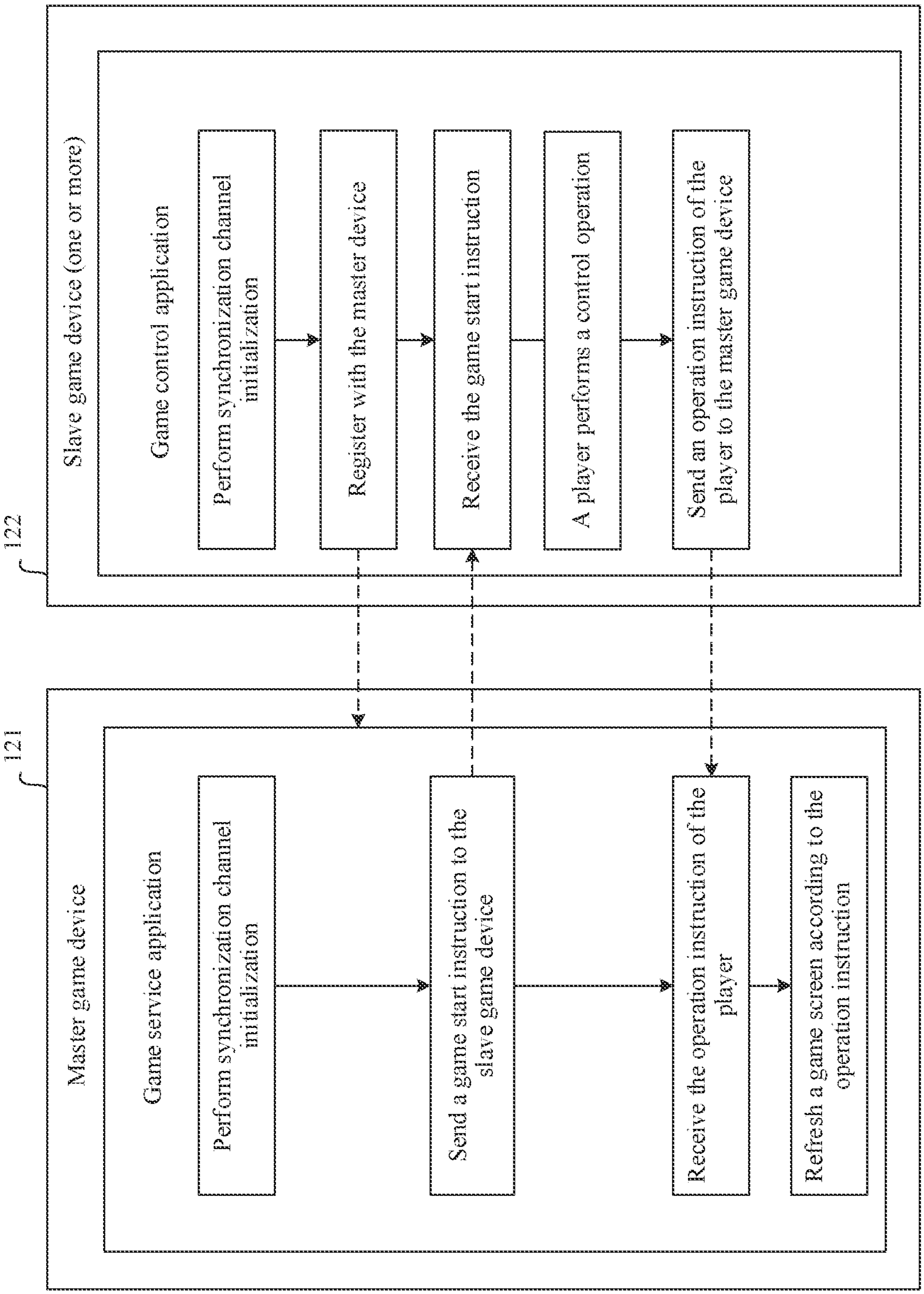
FIG. 12 is a schematic diagram of a data exchange process of a multiplayer game according to an embodiment of this application.

FIG. 12 is a schematic diagram of a data exchange process of a multiplayer game according to an embodiment of this application. As shown in FIG. 12, a master game device 121 and a slave game device 122 are included. The master game device 121 is the large-screen device 113 in FIG. 11, and there may be one or more slave game devices 122. The slave game device 122 may include the mobile phone 111 and the mobile phone 112 in FIG. 11. A game service application runs on the master game device 121, and a game control application runs on the slave game device 122.

The master game device 121 may first perform synchronization channel initialization, to allocate a second channel identifier to the game service application in the master game device 121. Then, the master game device 121 broadcasts the second channel identifier to the slave game device 122. The slave game device 122 may establish a connection channel with the master game device 121 based on the second channel identifier, where the connection channel may include but is not limited to a Bluetooth channel, Wi-Fi point-to-point, and the like. In addition, the slave game device 122 further allocates a first channel identifier to the game control application in the slave game device 122. The slave game device 122 transmits the first channel identifier to the master game device 121 through the established connection channel, to register with the master game device 121.

After a process such as initialization registration is completed, the master game device 121 may send a game start instruction to the slave game device 122 based on the registered slave device and the corresponding connection channel. After receiving the game start instruction through the corresponding connection channel, the slave game device 122 may display a corresponding operation interface. A player inputs a control operation to the slave game device 121. After obtaining an operation instruction of the player, the game control application in the slave game device 121 may transmit the operation instruction of the player to the master game device 121 through the connection channel corresponding to the second channel identifier of the master game device 121. After receiving the operation instruction of the player, the master game device 121 refreshes a game interface according to the operation instruction of the player.

It can be learned from the foregoing descriptions that, according to the data synchronization solution provided in this embodiment of this application, an effect of performing multiplayer collaborative control on a game by using the master game device and the slave game device in a near field environment can be implemented. In addition, compared with a solution in which a conventional multiplayer game needs to depend on an environment of a cloud server, or a game control end can only be a specific device (for example, a handle), in the data synchronization solution in this embodiment, synchronization of dynamic data of a game in a near field environment is implemented without depending on a cloud server or an account login mechanism. In addition, a type of a device serving as a game control end is further extended, so that components such as displays and sensors of different devices can be effectively used to complete input of game control instructions of a user.

Figure 13:
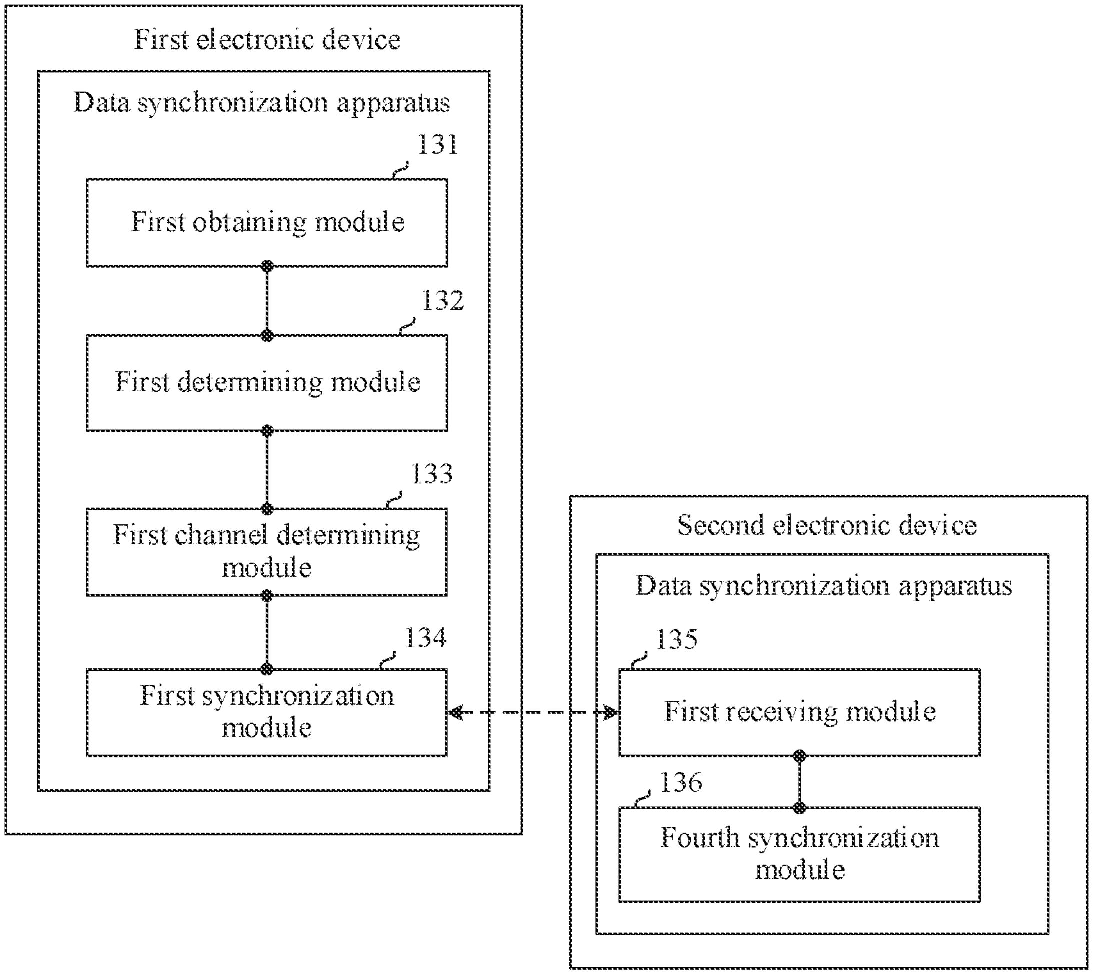
FIG. 13 is a block diagram of a structure of a data synchronization apparatus according to an embodiment of this application.

Corresponding to the data synchronization method in the embodiment corresponding to FIG. 3, FIG. 13 is a block diagram of a structure of a data synchronization apparatus according to an embodiment of this application. The data synchronization apparatus may be applied to a first electronic device. For ease of description, only a part related to this embodiment of this application is shown.

As shown in FIG. 13, the data synchronization apparatus may include:

a first obtaining module 131, configured to obtain first to-be-synchronized data of a first application, where the first electronic device includes the first application;

a first determining module 132, configured to determine a first channel identifier, where the first channel identifier is an identifier allocated by a second electronic device to a second application, the second electronic device includes the second application, and each first channel identifier corresponds to one second electronic device:

a first channel determining module 133, configured to determine a connection channel corresponding to the first channel identifier, where the connection channel is a connection channel that has been established between the first electronic device and the second electronic device, and each first channel identifier corresponds to one connection channel; and a first synchronization module 134, configured to transmit the first to-be-synchronized data to the second electronic device through the connection channel corresponding to the first channel identifier, to indicate the second electronic device to synchronize the first to-be-synchronized data to the second application.

In some embodiments, the apparatus may further include a first channel identifier allocation module, configured to: allocate a second channel identifier to the first application; broadcast the second channel identifier to one or more second electronic devices, where the second channel identifier is used to indicate the second electronic device to establish a connection channel with the first electronic device, record a correspondence between a second channel identifier and a connection channel, and allocate the first channel identifier to the second application; receive the first channel identifier sent by the one or more second electronic devices; and establish a correspondence between each first channel identifier and a corresponding connection channel.

In some embodiments, the first channel identifier includes identification information of the second electronic device and identification information of the first application; and the second channel identifier includes identification information of the first electronic device and identification information of the first application.

In some embodiments, the apparatus may further include a second synchronization module, configured to: receive second to-be-synchronized data that is of the second application and that is sent by the second electronic device through a connection channel corresponding to the second channel identifier; and synchronize the second to-be-synchronized data to the first application.

In some embodiments, the apparatus may further include: an indication information receiving module, configured to receive indication information sent by the second electronic device through the connection channel corresponding to the second channel identifier, where the indication information is used to indicate to transmit the second to-be-synchronized data to another second electronic device, and the another second electronic device is an electronic device other than the second electronic device that sends the second to-be-synchronized data in a plurality of second electronic devices; and a third synchronization module, configured to: determine a first channel identifier of the another second electronic device; determine a connection channel corresponding to the first channel identifier of the another second electronic device; and transmit the second to-be-synchronized data to the another second electronic device through the connection channel corresponding to the first channel identifier of the another second electronic device, to indicate the another second electronic device to synchronize the second to-be-synchronized data to a second application in the another second electronic device.

In some embodiments, the apparatus may further include a first receiving determining module, configured to: determine whether to allow receiving of the second to-be-synchronized data; and if receiving of the second to-be-synchronized data is allowed, enter the step of receiving second to-be-synchronized data that is of the second application and that is sent by the second electronic device through a connection channel corresponding to the second channel identifier.

In some embodiments, the first receiving determining module is specifically configured to: determine a first target data type of the second to-be-synchronized data; determine whether a first receiving option corresponding to the first target data type is in an on state; and if the first receiving option is in the on state, determine to allow receiving of the second to-be-synchronized data; or if the first receiving option is in an off state, determine not to allow receiving of the second to-be-synchronized data, where each data type corresponds to one receiving option.

In some embodiments, the apparatus may further include a first sending determining module, configured to: determine whether to allow sending of the first to-be-synchronized data; and if sending of the first to-be-synchronized data is allowed, enter the step of determining a first channel identifier.

In some embodiments, the first sending determining module is specifically configured to: determine a second target data type of the first to-be-synchronized data; determine whether a first sending option corresponding to the second target data type is in an on state; and if the first sending option is in the on state, determine to allow sending of the first to-be-synchronized data; or if the first sending option is in an off state, determine not to allow sending of the first to-be-synchronized data, where each data type corresponds to one sending option.

In some embodiments, the data type includes at least one of a message, an object, a large byte, a file, and a stream.

In some embodiments, the apparatus further includes a first synchronization option setting module, configured to: obtain a setting instruction of a first synchronization option, where the first synchronization option includes the first receiving option and the first sending option; and set the first synchronization option based on a data type, a synchronization action, and an option setting value in the setting instruction, where the synchronization action includes data sending and data receiving.

The data synchronization apparatus has a function of implementing the data synchronization method in the embodiment corresponding to FIG. 3. The function may be implemented by hardware, or may be implemented by hardware executing corresponding software. The hardware or software includes one or more modules corresponding to the foregoing function, and the module may be software and/or hardware.

Corresponding to the data synchronization method in the foregoing embodiment, FIG. 13 is a block diagram of a structure of a data synchronization apparatus according to an embodiment of this application. The data synchronization apparatus may be applied to a second electronic device. For ease of description, only a part related to this embodiment of this application is shown.

As shown in FIG. 13, the data synchronization apparatus may include:

a first receiving module 135, configured to receive, through a connection channel corresponding to a second channel identifier, first to-be-synchronized data sent by a first electronic device, where the second channel identifier is an identifier allocated by the first electronic device to a first application, the first electronic device includes the first application, and the first to-be-synchronized data is data of the first application; and a fourth synchronization module 136, configured to synchronize the first to-be-synchronized data to a second application, where the second electronic device includes the second application.

In some embodiments, the apparatus may further include a second channel identifier allocation module, configured to: receive the second channel identifier broadcast by the first electronic device, where each second channel identifier corresponds to one first electronic device; establish a connection channel with the first electronic device based on the second channel identifier; allocate a first channel identifier to the second application; and transmit the first channel identifier to the first electronic device through the connection channel established based on the second channel identifier.

In some embodiments, the apparatus may further include a second receiving determining module, configured to: determine whether to allow receiving of the first to-be-synchronized data; and if receiving of the first to-be-synchronized data is allowed, enter the step of receiving, through a connection channel corresponding to a second channel identifier, first to-be-synchronized data sent by a first electronic device.

In some embodiments, the second receiving determining module is specifically configured to: determine a third target data type of the first to-be-synchronized data; determine whether a second receiving option corresponding to the third target data type is in an on state; and if the second receiving option is in the on state, determine to allow receiving of the first to-be-synchronized data; or if the second receiving option is in an off state, determine not to allow receiving of the first to-be-synchronized data, where each data type is corresponding to one receiving option.

In some embodiments, the apparatus may further include a fifth synchronization module, configured to: obtain second to-be-synchronized data of the second application; and transmit the second to-be-synchronized data to the first electronic device through the connection channel corresponding to the second channel identifier, to indicate the first electronic device to synchronize the second to-be-synchronized data to the first application.

In some embodiments, the apparatus may further include a second sending determining module, configured to: determine whether to allow sending of the second to-be-synchronized data; and if sending of the second to-be-synchronized data is allowed, enter the step of transmitting the second to-be-synchronized data to the first electronic device through the connection channel corresponding to the second channel identifier.

In some embodiments, the second sending determining module is specifically configured to: determine a fourth target data type of the second to-be-synchronized data; determine whether a second sending option of the fourth target data type is in an on state; and if the second sending option is in the on state, determine to allow sending of the second to-be-synchronized data; or if the second sending option is in an off state, determine not to allow sending of the second to-be-synchronized data, where each data type corresponds to one sending option.

In some embodiments, the apparatus may further include a second synchronization option setting module, configured to: obtain a setting instruction of a second synchronization option, where the second synchronization option includes the second receiving option and the second sending option; and set the second synchronization option based on a data type, a synchronization action, and an option setting value in the setting instruction, where the synchronization action includes data sending and data receiving.

In some embodiments, the first channel identifier includes identification information of the second electronic device and identification information of the first application; and the second channel identifier includes identification information of the first electronic device and identification information of the first application.

In some embodiments, the data type includes at least one of a message, an object, a large byte, a file, and a stream.

The data synchronization apparatus has a function of implementing the data synchronization method in the foregoing corresponding embodiment. The function may be implemented by hardware, or may be implemented by hardware executing corresponding software. The hardware or software includes one or more modules corresponding to the foregoing function, and the module may be software and/or hardware.

It should be noted that content such as information exchange between the foregoing apparatuses/modules and an execution process thereof is based on a same concept as the method embodiments of this application. For details about specific functions and technical effects of the content, refer to the method embodiments. The details are not described herein again.

Figure 14:
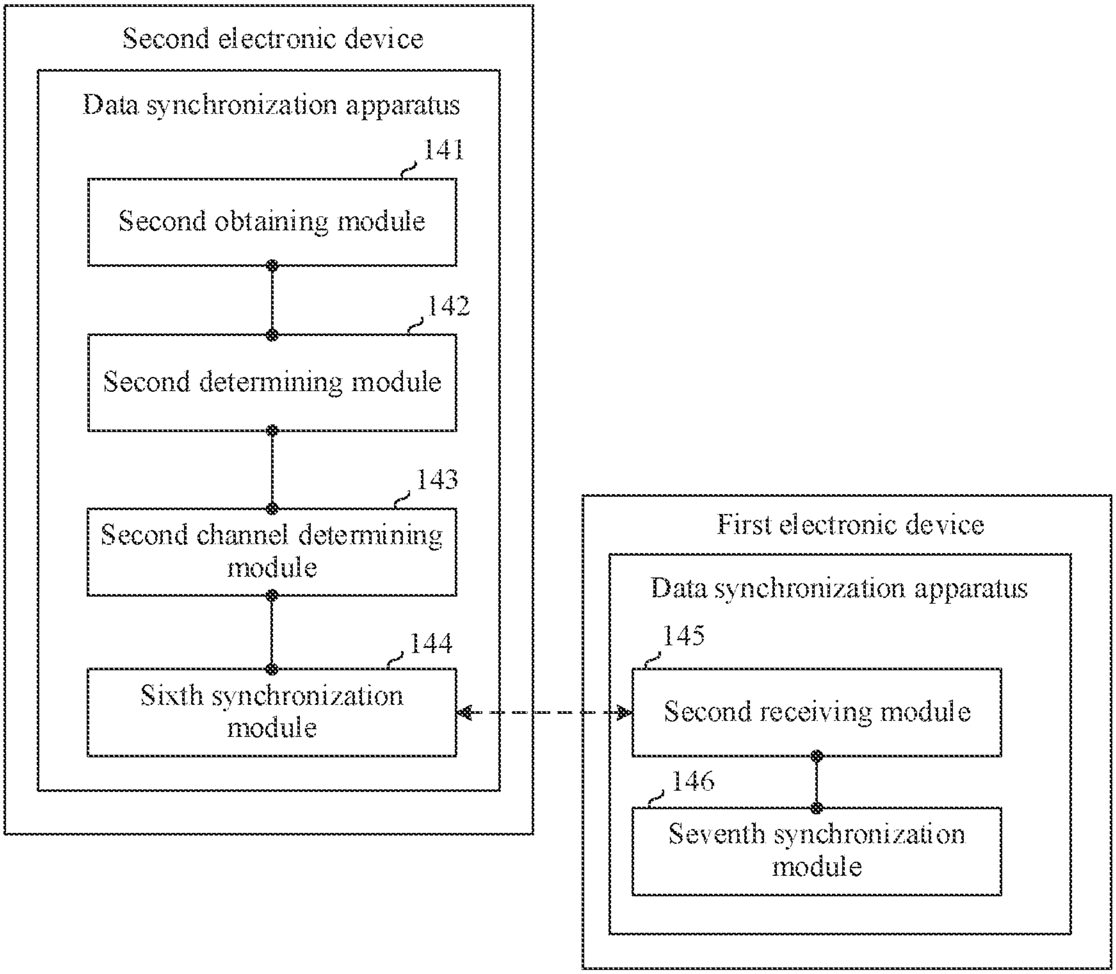
FIG. 14 is a block diagram of a structure of a data synchronization apparatus according to an embodiment of this application.

Corresponding to the data synchronization method in the foregoing embodiment, FIG. 14 is a block diagram of a structure of a data synchronization apparatus according to an embodiment of this application. The data synchronization apparatus may be applied to a second electronic device. For ease of description, only a part related to this embodiment of this application is shown.

As shown in FIG. 14, the data synchronization apparatus may include:

a second obtaining module 141, configured to obtain third to-be-synchronized data of a second application, where the second electronic device includes the second application;

a second determining module 142, configured to determine a second channel identifier, where the second channel identifier is an identifier allocated by a first electronic device to a first application, the first electronic device includes the first application, and each second channel identifier corresponds to one first electronic device;

a second channel determining module 143, configured to determine a connection channel corresponding to the second channel identifier, where the connection channel is a connection channel that has been established between the first electronic device and the second electronic device, and each second channel identifier corresponds to one connection channel; and a sixth synchronization module 144, configured to transmit the third to-be-synchronized data to the first electronic device through the connection channel corresponding to the second channel identifier, to indicate the first electronic device to synchronize the third to-be-synchronized data to the first application.

In some embodiments, the apparatus may further include a third channel identifier allocation module, configured to: receive the second channel identifier broadcast by the first electronic device; establish a connection channel with the first electronic device based on the second channel identifier; allocate a first channel identifier to the second application; and transmit the first channel identifier to the first electronic device through the connection channel established based on the second channel identifier.

In some embodiments, the apparatus further includes an indication information sending module, configured to send, to the first electronic device, indication information used to indicate to transmit the third to-be-synchronized data to another second electronic device, where the another second electronic device is an electronic device other than the second electronic device that sends the third to-be-synchronized data in a plurality of second electronic devices.

The data synchronization apparatus has a function of implementing the data synchronization method in the foregoing corresponding embodiment. The function may be implemented by hardware, or may be implemented by hardware executing corresponding software. The hardware or software includes one or more modules corresponding to the foregoing function, and the module may be software and/or hardware.

It should be noted that content such as information exchange between the foregoing apparatuses/modules and an execution process thereof is based on a same concept as the method embodiments of this application. For details about specific functions and technical effects of the content, refer to the method embodiments. The details are not described herein again.

Corresponding to the data synchronization method in the foregoing embodiment, FIG. 14 is a block diagram of a structure of a data synchronization apparatus according to an embodiment of this application. The data synchronization apparatus may be applied to a first electronic device. For ease of description, only a part related to this embodiment of this application is shown.

As shown in FIG. 14, the apparatus may include:

a second receiving module 145, configured to receive, through a connection channel corresponding to a first channel identifier, third to-be-synchronized data sent by a second electronic device, where the first channel identifier is an identifier allocated by the second electronic device to a second application, the second electronic device includes the second application, and the third to-be-synchronized data is data of the second application; and a seventh synchronization module 146, configured to synchronize the third to-be-synchronized data to a first application, where the first electronic device includes the first application.

In some embodiments, the apparatus further includes a fourth channel identifier allocation module, configured to: allocate a second channel identifier to the first application; broadcast the second channel identifier to one or more second electronic devices, where the second channel identifier is used to indicate the second electronic device to establish a connection channel with the first electronic device, record a correspondence between a second channel identifier and a connection channel, and allocate the first channel identifier to the second application; receive the first channel identifier sent by the one or more second electronic devices; and establish a correspondence between each first channel identifier and a corresponding connection channel.

The data synchronization apparatus has a function of implementing the data synchronization method in the foregoing corresponding embodiment. The function may be implemented by hardware, or may be implemented by hardware executing corresponding software. The hardware or software includes one or more modules corresponding to the foregoing function, and the module may be software and/or hardware.

It should be noted that content such as information exchange between the foregoing apparatuses/modules and an execution process thereof is based on a same concept as the method embodiments of this application. For details about specific functions and technical effects of the content, refer to the method embodiments. The details are not described herein again.

An embodiment of this application further provides a computer-readable storage medium. The computer-readable storage medium stores a computer program. When the computer program is executed by a processor, steps in the foregoing method embodiments can be implemented.

An embodiment of this application provides a computer program product. When the computer program product runs on an electronic device, the electronic device is enabled to implement the steps in the foregoing method embodiments when executing the computer program product.

An embodiment of this application further provides a chip system. The chip system includes a processor, the processor is coupled to a memory, and the processor executes a computer program stored in the memory, to implement the method in the foregoing method embodiments. The chip system may be a single chip or a chip module including a plurality of chips.

In the foregoing embodiments, descriptions of all embodiments have respective focuses. For a part that is not described in detail or recorded in an embodiment, refer to related descriptions in other embodiments.

It should be understood that sequence numbers of the steps do not mean execution sequences in the foregoing embodiments. The execution sequences of the processes should be determined based on functions and internal logic of the processes, and should not be construed as any limitation on the implementation processes of embodiments of this application. In addition, in the descriptions of the specification and claims of this application, the terms “first”, “second”, “third”, and the like are merely intended for the purpose of differentiated description, but shall not be understood as an indication or an implication of relative importance. Referring to “an embodiment”. “some embodiments”, or the like in the specification of this application indicates that one or more embodiments of this application include a specific feature, structure, or characteristic described with reference to embodiments. Therefore, statements such as “in an embodiment”, “in some embodiments”, “in some other embodiments”, and “in other embodiments” that appear at different places in this specification do not necessarily mean referring to a same embodiment. Instead, the statements mean “one or more but not all of embodiments”, unless otherwise specifically emphasized in another manner.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a first electronic device, wherein the method comprises:

before obtaining first to-be-synchronized data, completing a registration process comprising:

receiving a plurality of first channel identifiers from a plurality of second electronic devices, wherein each first channel identifier is pre-allocated by one of the plurality of second electronic devices to a respective second application in that second electronic device during the registration process; and establishing, for each received first channel identifier, a correspondence between that first channel identifier and a respective connection channel that has been established between the first electronic device and the respective second electronic device;

obtaining the first to-be-synchronized data of a first application in the first electronic device;

obtaining the plurality of first channel identifiers from the correspondences;

selecting, for each first channel identifier, a connection channel to route the first to-be-synchronized data based on the correspondence between the first channel identifier and the corresponding connection channel; and simultaneously transmitting the first to-be-synchronized data to the second electronic devices through the selected connection channels to instruct the second electronic devices to synchronize the first to-be-synchronized data to the second applications.

2. The method of claim 1, wherein before obtaining the first to-be-synchronized data, the method further comprises:

allocating a second channel identifier to the first application;

broadcasting the second channel identifier to the second electronic devices, wherein the second channel identifier instructs the second electronic devices to establish the connection channel with the first electronic device, record a correspondence between the second channel identifier and the connection channel, and allocate the first channel identifier to the second application;

receiving the first channel identifiers from the second electronic devices; and establishing the correspondence between the first channel identifier and the connection channel.

3. The method of claim 2, wherein the first channel identifier comprises first identification information of the second electronic device and second identification information of the first application, and wherein the second channel identifier comprises third identification information of the first electronic device and the second identification information.

4. The method of claim 2, further comprising:

receiving, from at least one second electronic device through the connection channel, second to-be-synchronized data of the second application; and synchronizing the second to-be-synchronized data to the first application.

5. The method of claim 4, wherein before receiving second to-be-synchronized data of the second application, further comprising:

determining whether to allow receiving of second to-be-synchronized data of the second application from the at least one second electronic device through the connection channel; and receiving the second to-be-synchronized data when allowing receiving of the second to-be-synchronized data.

6. The method of claim 1, further comprising:

determining whether to allow sending of the first to-be-synchronized data; and selecting the first channel identifier from the pre-established correspondences when allowing sending of the first to-be-synchronized data.

7. The method of claim 6, wherein determining whether to allow sending of the first to-be-synchronized data comprises:

determining a target data type of the first to-be-synchronized data;

determining whether a sending option corresponding to the target data type is in an on state;

determining to allow sending of the first to-be-synchronized data when the sending option is in the on state; and determining not to allow sending of the first to-be-synchronized data when the sending option is in an off state.

8. The method of claim 1, further comprising:

obtaining a setting instruction of a synchronization option, wherein the synchronization option comprises a receiving option and a sending option; and setting the synchronization option based on a data type, a synchronization action, and an option setting value in the setting instruction, wherein the synchronization action comprises data sending and data receiving.

9. A method implemented by a plurality of second electronic devices, wherein the method comprises:

before synchronizing first to-be-synchronized data to a plurality of second applications, completing a registration process comprising:

receiving a plurality of second channel identifiers from a first electronic device, wherein the second channel identifiers are allocated by the first electronic device to a first application in the first electronic device during the registration process;

establishing, for each received second channel identifier, a plurality of connection channels between the plurality of second electronic devices and the first electronic device;

allocating a plurality of first channel identifiers, wherein each second electronic device allocates a first channel identifier to a respective second application in that second electronic device; and transmitting the plurality of first channel identifiers to the first electronic device through the plurality of connection channels;

simultaneously receiving, through the plurality of connection channels established during the registration process the first to-be-synchronized data from the first electronic device; and synchronizing the first to-be-synchronized data to the plurality of second applications of the second electronic devices.

10. The method of claim 9, wherein before receiving the first to-be-synchronized data, the method further comprises:

receiving the second channel identifier from the first electronic device, wherein the second channel identifier corresponds to the first electronic device;

establishing the connection channel with the first electronic device based on the second channel identifier;

allocating a first channel identifier to the second application; and transmitting the first channel identifier to the first electronic device through the connection channel.

11. The method of claim 9, wherein before receiving the first to-be-synchronized data, the method further comprises:

determining whether to allow receiving of the first to-be-synchronized data; and further receiving, through the connection channel, the first to-be-synchronized data from the first electronic device when allowing receiving of the first to-be-synchronized data.

12. The method of claim 9, further comprising:

obtaining second to-be-synchronized data of the second application; and transmitting the second to-be-synchronized data to the first electronic device through the connection channel to instruct the first electronic device to synchronize the second to-be-synchronized data to the first application.

13. The method of claim 12, wherein before transmitting the second to-be-synchronized data, the method further comprises:

determining whether to allow sending of the second to-be-synchronized data; and further transmitting the second to-be-synchronized data to the first electronic device through the connection channel when allowing sending of the second to-be-synchronized data.

14. The method of claim 9, further comprising:

obtaining a setting instruction of a synchronization option, wherein the synchronization option comprises a receiving option and a sending option; and setting the synchronization option based on a data type, a synchronization action, and an option setting value in the setting instruction, wherein the synchronization action comprises data sending and data receiving.

15. The method of claim 10, wherein the first channel identifier comprises first identification information of the second electronic device and second identification information of the first application, and wherein the second channel identifier comprises third identification information of the first electronic device and the second identification information.

16. A first electronic device comprising:

a memory configured to store instructions and a first application; and a processor coupled to the memory and configured to execute the instructions to cause the first electronic device to:

before obtaining first to-be-synchronized data, complete a registration process by:

receiving a plurality of first channel identifiers from a plurality of second electronic devices, wherein each first channel identifier is pre-allocated by one of the plurality of second electronic devices to a respective second application in that second electronic device during the registration process; and establishing, for each received first channel identifier, a correspondence between that first channel identifier and a respective connection channel that has been established between the first electronic device and the respective second electronic device;

obtain the first to-be-synchronized data of the first application;

determine the plurality of first channel identifiers from the pre-established correspondences;

select, for each of the plurality of first channel identifiers, a corresponding connection channel to route the first to-be-synchronized databased on the correspondence between the first channel identifier and the corresponding connection channel; and simultaneously transmit the first to-be-synchronized data to the second electronic devices through the selected connection channels to instruct the second electronic devices to synchronize the first to-be-synchronized data to the second applications.

17. A computer program product comprising computer-executable instructions that are stored on a non-transitory computer-readable storage medium and that, when executed by a processor, cause a first electronic device to:

before obtaining first to-be-synchronized data, complete a registration process by:

receiving a plurality of first channel identifiers from a plurality of second electronic devices, wherein each first channel identifier is pre-allocated by one of the plurality of second electronic devices to a respective second application in that second electronic device during the registration process; and establishing, for each received first channel identifier, a correspondence between that first channel identifier and a respective connection channel that has been established between the first electronic device and the respective second electronic device;

obtain the first to-be-synchronized data of a first application in the first electronic device;

determine a plurality of first channel identifiers from the pre-established correspondences;

select, for each first channel identifier, a connection channel to route the first to-be-synchronized data based on the correspondence between the first channel identifier and the corresponding connection channel; and simultaneously transmit the first to-be-synchronized data to the second electronic devices through the selected connection channels to instruct the second electronic devices to synchronize the first to-be-synchronized data to the second applications.

18. The computer program product of claim 17, wherein before obtaining the first to-be-synchronized data, the computer-executable instructions further cause the first electronic device to:

allocate a second channel identifier to the first application;

broadcast the second channel identifier to the second electronic devices, wherein the second channel identifier instructs the second electronic devices to establish the connection channel with the first electronic device, record a correspondence between the second channel identifier and the connection channel, and allocate the first channel identifier to the second application;

receive the first channel identifiers from the second electronic devices; and establish the correspondence between the first channel identifier and the connection channel.

19. The computer program product of claim 18, wherein the first channel identifier comprises first identification information of the second electronic device and second identification information of the first application, and wherein the second channel identifier comprises third identification information of the first electronic device and the second identification information.

20. The computer program product of claim 18, wherein the computer-executable instructions further cause the first electronic device to:

receive, from at least one second electronic device through the connection channel, second to-be-synchronized data of the second application; and synchronize the second to-be-synchronized data to the first application.

* * * * *